US011736370B2

(12) United States Patent
Wang et al.

(10) Patent No.: US 11,736,370 B2
(45) Date of Patent: Aug. 22, 2023

(54) FIELD DATA TRANSMISSION METHOD, DEVICE AND SYSTEM, AND COMPUTER-READABLE MEDIUM

(71) Applicant: Siemens Aktiengesellschaft, Munich (DE)

(72) Inventors: Li Wang, Beijing (CN); Hai Tao Zhang, Beijing (CN); Wen Jing Zhou, Wuxi (CN); He Yu, Wuxi (CN); Wei Sun, Wuxi (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/630,704

(22) PCT Filed: Aug. 1, 2019

(86) PCT No.: PCT/CN2019/098834
§ 371 (c)(1),
(2) Date: Jan. 27, 2022

(87) PCT Pub. No.: WO2021/016981
PCT Pub. Date: Feb. 4, 2021

(65) Prior Publication Data
US 2022/0263732 A1    Aug. 18, 2022

(51) Int. Cl.
*H04L 43/02*  (2022.01)
*H04L 67/10*  (2022.01)
(Continued)

(52) U.S. Cl.
CPC ............ *H04L 43/02* (2013.01); *H04L 41/044* (2013.01); *H04L 67/10* (2013.01); *H04L 67/1051* (2013.01); *H04L 67/12* (2013.01)

(58) Field of Classification Search
CPC .... H04L 41/044; H04L 67/01; H04L 67/1051; H04L 67/12; H04L 67/125;
(Continued)

(56) References Cited

U.S. PATENT DOCUMENTS 6,108,782 A  *  8/2000  Fletcher ................... H04L 9/40
                                                    713/153
9,838,476 B2 * 12/2017  Maturana .............. G06F 9/5072
(Continued)

FOREIGN PATENT DOCUMENTS

| CN | 104954242 A | 9/2015 |
| CN | 106412113 A | 2/2017 |

(Continued)

OTHER PUBLICATIONS

International Search Report PCT/ISA/210 for PCT/CN2019/098834 dated Aug. 1, 2019.
(Continued)

*Primary Examiner* — Brendan Y Higa
(74) *Attorney, Agent, or Firm* — Harness, Dickey & Pierce, P.L.C.

(57) ABSTRACT

A field data transmission method comprises: a cloud platform determining at least one first device operation index be obtained via data analysis. For each first device operation index, the cloud platform generates control information for the first device operation index. The control information is used to determine a primary edge controller from among at least one edge controller, wherein the primary edge controller is used to send first field data to the cloud platform, the first field data is used for data analysis by the cloud platform to obtain the first device operation index, and the first field data is obtained by the primary edge controller preprocessing second field data. The cloud platform sends each piece of control information to each edge controller, respectively.

(Continued)

The cloud platform receives first field data from each primary edge controller, respectively.

25 Claims, 19 Drawing Sheets

(51) Int. Cl.
*H04L 41/044* (2022.01)
*H04L 67/12* (2022.01)
*H04L 67/104* (2022.01)

(58) Field of Classification Search
CPC ... H04L 41/04–044; H04L 41/046–048; H04L 41/0893–0895; H04L 41/34–40; H04L 43/20; H04L 43/00–028; G16Y 20/00–40; G16Y 30/00–10; G16Y 40/00–35; H04W 84/18–22

See application file for complete search history.

(56) References Cited

U.S. PATENT DOCUMENTS

| | | | |
|---|---|---|---|
| 10,498,617 B1* | 12/2019 | Dothan | H04L 61/4511 |
| 10,887,166 B2* | 1/2021 | Van Der Geer | H04W 40/34 |
| 11,172,470 B1* | 11/2021 | Guieu | H04L 41/12 |
| 11,327,806 B1* | 5/2022 | Nagaraja | G06N 3/08 |
| 2013/0212214 A1* | 8/2013 | Lawson | H04L 67/12 |
| | | | 709/217 |
| 2015/0161073 A1 | 6/2015 | Beeson et al. | |
| 2015/0188837 A1* | 7/2015 | Djukic | H04L 67/02 |
| | | | 709/226 |
| 2015/0281355 A1 | 10/2015 | Maturana et al. | |
| 2015/0281356 A1* | 10/2015 | Maturana | G06F 9/5072 |
| | | | 709/217 |
| 2016/0274552 A1* | 9/2016 | Strohmenger | G06Q 10/06 |
| 2017/0039239 A1* | 2/2017 | Saadat-Panah | H04L 67/1023 |
| 2017/0359238 A1* | 12/2017 | Hughes | H04L 43/062 |
| 2018/0063244 A1* | 3/2018 | Maturana | G06F 9/5072 |
| 2018/0227214 A1* | 8/2018 | Huang | H04L 67/12 |
| 2018/0278474 A1* | 9/2018 | Van Der Geer | H04L 67/1051 |
| 2019/0028325 A1* | 1/2019 | Ma | H04L 67/10 |
| 2019/0036846 A1* | 1/2019 | Nie | H04L 67/10 |
| 2019/0041824 A1* | 2/2019 | Chavez | H04L 67/34 |
| 2019/0041830 A1* | 2/2019 | Yarvis | H04L 67/04 |
| 2019/0339681 A1* | 11/2019 | Manturana | G05B 23/0283 |
| 2020/0005264 A1* | 1/2020 | Patterson | G06Q 50/06 |
| 2020/0059520 A1 | 2/2020 | Mao | |
| 2020/0136994 A1* | 4/2020 | Doshi | G06F 16/90339 |
| 2020/0301685 A1* | 9/2020 | Verma | H04L 67/12 |
| 2021/0307189 A1* | 9/2021 | Lucero | H05K 7/1422 |
| 2022/0035651 A1* | 2/2022 | Maurya | H04L 41/042 |

FOREIGN PATENT DOCUMENTS

| | | |
|---|---|---|
| CN | 108459563 A | 8/2018 |
| CN | 109327486 A | 2/2019 |
| CN | 109491301 A | 3/2019 |
| WO | WO-2014152104 A1 * 9/2014 ........ H04W 52/0216 |

OTHER PUBLICATIONS

International Search Report and Written Opinion and English translation thereof dated May 9, 2020.

* cited by examiner

FIELD DATA TRANSMISSION METHOD, DEVICE AND SYSTEM, AND COMPUTER-READABLE MEDIUM

CROSS-REFERENCE TO RELATED APPLICATION(S)

This application is the National Phase under 35 U.S.C. § 371 of International Application No. PCT/CN2019/098834, which has an international filing date of Aug. 1, 2019, and which designated the United States of America, the entire contents of which are incorporated herein by reference.

FIELD

Embodiments of the present invention relate to the field of communication technologies, and in particular, to a field data transmission method, device and system, and a computer-readable medium.

BACKGROUND

As the application of the Internet of Things (IoT) technology in the industrial field becomes more and more extensive, an edge controller may be used to collect field data generated during the operation of field apparatus, and then after field data collected by the edge controller are uploaded to a cloud platform, the cloud platform may, by analyzing the field data, determine the operating state of the field apparatus, so that a user can conveniently learn the operating state of the field apparatus.

At present, an edge controller is connected to a cloud platform through a gateway, and the edge controller, after collecting field data, uploads the collected field data to the cloud platform through the gateway.

For a conventional method of transmitting field data, since a large factory usually runs a plurality of production lines each requiring one or more edge controllers for collecting field data, each edge controller needs to, through a gateway, upload collected field data to a cloud platform, and a cloud platform needs to find the data required for data analysis from the field data uploaded by each edge controller, and then conduct a combined analysis of the found data; a cloud platform needs to consume considerable computing resources for data search and data analysis, which leads to high costs of field data analysis with a cloud platform.

SUMMARY

Against the above-mentioned background, a field data transmission method, device and system, and a computer-readable medium provided by embodiments of the present invention allow a reduction in the costs of analyzing field data with a cloud platform.

In a first aspect, an embodiment of the present invention provides a field data transmission method, comprising:

determining, with one cloud platform, at least one first apparatus operation indicator that needs to be obtained by data analysis;

for each of the first apparatus operation indicators, generating, with the cloud platform, a control message for the first apparatus operation indicator, wherein the control message is used for determining a master edge controller from at least one edge controller, the master edge controller is used for sending first field data to the cloud platform, the first field data are used for the cloud platform to perform data analysis to obtain the first apparatus operation indicator, the first field data are obtained by preprocessing second field data with the master edge controller, the second field data are collected by at least one of the edge controllers, and the second field data are used for characterizing an operating state of at least one field apparatus;

sending, with the cloud platform, each of the control messages to each of the edge controllers, respectively;

receiving, with the cloud platform, the first field data from each of the master edge controllers, respectively.

In a first possible implementation manner, according to the first aspect, said determining of at least one first apparatus operation indicator that needs to be obtained by data analysis comprises:

performing data analysis on third field data from the at least one edge controller to obtain a numerical value of at least one second apparatus operation indicator, wherein the time when the cloud platform receives the third field data is earlier than the time when the first field data are received;

judging respectively whether the numerical value of each of the second apparatus operation indicators is within a corresponding normal value range;

if the numerical value of at least one of the second apparatus operation indicators is outside the corresponding normal value range, then determining at least one of the first apparatus operation indicators according to the value of each of the second apparatus operation indicators, wherein the first apparatus operation indicator is different from the second apparatus operation indicator.

In a second possible implementation manner, according to the first aspect, for each of the first apparatus operation indicators, after generating, with the cloud platform, a control message for the first apparatus operation indicator, the method further comprises:

for each of the first apparatus operation indicators, determining, with the cloud platform, a preprocessing algorithm corresponding to the first apparatus operation indicator, wherein the preprocessing algorithm is used for a first master edge controller to preprocess the second field data into the first field data, and the first master edge controller is configured to send the first field data required for data analysis of the first apparatus operation indicator to the cloud platform;

sending, with the cloud platform, the preprocessing algorithm to the first master edge controller.

In a third possible implementation manner, according to the first aspect, after said receiving of the first field data from each of the master edge controllers respectively, the method further comprises:

for each of the master edge controllers, performing data analysis on the first field data from the master edge controller to obtain a corresponding numerical value of the first apparatus operation indicator;

judging whether the numerical value of the first apparatus operation indicator is abnormal;

if the numerical value of the first apparatus operation indicator is abnormal, then determining an algorithm update instruction according to the numerical value of the first apparatus operation indicator, wherein the algorithm update instruction is used for instructing the master edge controller to preprocess the second field data obtained later according to a target preprocessing algorithm;

sending the algorithm update instruction to the master edge controller.

In a fourth possible implementation manner, in combination with the first aspect and any one of the first possible implementation manner, the second possible implementation manner, and the third possible implementation manner of the first aspect, after said receiving of the first field data from each of the master edge controllers respectively, the method further comprises:

for each of the master edge controllers, determining the load of the master edge controller according to the data amount and relationship between data of the first field data from the master edge controller, the number and complexity of the preprocessing algorithms run by the master edge controller, wherein at least one of the preprocessing algorithms is run on the master edge controller, and the different preprocessing algorithms are used for processing the different second field data into the corresponding first field data;

determining, from each of the master edge controllers, a second master edge controller with the largest load;

judging whether the load of the second master edge controller is higher than a preset first load threshold;

if the load of the second master edge controller is higher than the first load threshold, then generating a load transfer instruction, wherein the load transfer instruction is used for transferring at least one of the preprocessing algorithms running on the second master edge controller to a second edge controller for running, and instructing the second edge controller to send first field data obtained using each of the transferred preprocessing algorithms to the cloud platform, the load of the second edge controller being lower than a preset second load threshold, the second load threshold being lower than the second load threshold;

sending the load transfer instruction to the second master edge controller and the second edge controller.

In a second aspect, an embodiment of the present invention provides another field data transmission method, comprising:

receiving, with an edge controller, a control message from a cloud platform;

judging whether the edge controller is a master edge controller according to the control message;

if the edge controller is a master edge controller, then obtaining second field data according to the control message, wherein the second field data are used for characterizing an operating state of at least one field apparatus, the second field data include field data collected by at least one edge controller, and include field data collected by the master edge controller, and the second field data are preprocessed to obtain first field data, wherein the first field data are used for the cloud platform to perform data analysis to obtain a first apparatus operation indicator corresponding to the control message, and to send the first field data to the cloud platform;

if the edge controller is not a master edge controller, then collecting field data according to the control message and sending collected field data to the master edge controller indicated by the control message.

In a first possible implementation manner, according to the second aspect, before said preprocessing of the second field data to obtain first field data, the method further comprises: receiving a preprocessing algorithm from the cloud platform, wherein the preprocessing algorithm corresponds to the first apparatus operation indicator; correspondingly, said preprocessing of the second field data to obtain first field data comprises: preprocessing the second field data by using the preprocessing algorithm to obtain the first field data.

In a second possible implementation manner, according to the second aspect, after said sending of the first field data to the cloud platform, the method further comprises:

receiving an algorithm update instruction from the cloud platform;

according to the algorithm update instruction, replacing, with a target preprocessing algorithm, the preprocessing algorithm previously used for preprocessing the second field data, so as to, by using the target preprocessing algorithm, preprocess the second field data obtained again.

In a third possible implementation manner, in combination with the second aspect and any one of the first possible implementation manner and the second possible implementation manner of the second aspect, after sending the first field data to the cloud platform, the method further comprises:

receiving a load transfer instruction from the cloud platform;

identifying whether the edge controller is a second master edge controller or second edge controller indicated by the load transfer instruction;

if the edge controller is the second master edge controller indicated by the load transfer instruction, then transferring at least one preprocessing algorithm running on the edge controller to a second edge controller, so that the second edge controller obtains first field data by using each of the transferred preprocessing algorithms respectively, and sends the obtained first field data to the cloud platform, wherein the load of the second edge controller is lower than a preset second load threshold;

if the edge controller is the second edge controller indicated by the load transfer instruction, then obtaining at least one preprocessing algorithm indicated by the load transfer instruction that needs to be transferred, obtaining, for each of the transferred preprocessing algorithms, the second field data that need to be preprocessed by the preprocessing algorithm, preprocessing the obtained second field data by using the preprocessing algorithm to obtain first field data, and sending the obtained first field data to the cloud platform.

In a third aspect, an embodiment of the present invention provides a cloud platform, comprising:

an indicator determination module configured to determine at least one first apparatus operation indicator that needs to be obtained by data analysis;

a message generation module configured to generate, for each of the first apparatus operation indicators determined by the indicator determination module, a control message for the first apparatus operation indicator, wherein the control message is used for determining a master edge controller from at least one edge controller, the master edge controller is used for sending first field data to the cloud platform, the first field data are used for the cloud platform to perform data analysis to obtain the first apparatus operation indicator, the first field data are obtained by preprocessing second field data with the master edge controller, the second field data are collected by at least one of the edge controllers, and the second field data are used for characterizing an operating state of at least one field apparatus;

a message sending module configured to send each of the control messages generated by the message generation module to each of the edge controllers respectively;

a data receiving module configured to receive the first field data from each of the master edge controllers respectively, wherein each of the master edge controllers is determined by each of the control messages generated by the message generation module.

In a first possible implementation manner, according to the third aspect, the indicator determination module comprises:

a data analysis unit configured to perform data analysis on third field data from the at least one edge controller, and obtain at least one numerical value of a second apparatus operation indicator, wherein the time when the cloud platform receives the third field data is earlier than the time when the first field data are received;

a numerical value judgment unit configured to respectively judge whether the numerical value of each of the second apparatus operation indicators obtained by the data analysis unit is within a corresponding normal value range;

an indicator screening unit configured to, when the numerical value judgment unit determines that the numerical value of at least one of the second apparatus operation indicators is outside the corresponding normal value range, determine at least one of the first apparatus operation indicators according to the value of each of the second apparatus operation indicators, wherein the first apparatus operation indicator is different from the second apparatus operation indicator.

In a second possible implementation manner, according to the third aspect, the cloud platform further comprises: an algorithm determination module;

the algorithm determination module is configured to, for each of the first apparatus operation indicators determined by the indicator determination module, determine a preprocessing algorithm corresponding to the first apparatus operation indicator, wherein the preprocessing algorithm is used for a first master edge controller to preprocess the second field data into the first field data, and the first master edge controller is configured to send the first field data required for data analysis of the first apparatus operation indicator to the cloud platform;

the message sending module is further configured to send the preprocessing algorithm determined by the algorithm determination module to the first master edge controller.

In a third possible implementation manner, according to the third aspect, the cloud platform further comprises: an algorithm update module;

the algorithm update module is configured to, for each of the master edge controllers, perform data analysis on the first field data from the master edge controller that are received by the data receiving module, obtain the numerical value of the corresponding first apparatus operation indicator, judge whether the numerical value of the first apparatus operation indicator is abnormal, and, if the numerical value of the first apparatus operation indicator is abnormal, then determine an algorithm update instruction according to the numerical value of the first apparatus operation indicator, wherein the algorithm update instruction is used for instructing the master edge controller to preprocess the second field data obtained later according to a target preprocessing algorithm;

the message sending module is further configured to send the algorithm update instruction generated by the algorithm update module to the corresponding master edge controller.

In a fourth possible implementation manner, in combination with the third aspect and any one of the first possible implementation manner, the second possible implementation manner and the third possible implementation manner of the third aspect, the cloud platform further comprises: a load balancing module;

the load balancing module is configured to, for each of the master edge controllers, determine the load of the master edge controller according to the data amount and relationship between data of the first field data received by the data receiving module from the master edge controller, the number and complexity of the preprocessing algorithms run by the edge controller, wherein at least one of the preprocessing algorithms is run on the master edge controller, and the different preprocessing algorithms are used for processing the different second field data into the corresponding first field data, determining, from each of the master edge controllers, a second master edge controller with the largest load, judging whether the load of the second master edge controller is higher than a preset first load threshold, and, if the load of the second master edge controller is higher than the first load threshold, then generating a load transfer instruction, wherein the load transfer instruction is used for transferring at least one of the preprocessing algorithms running on the second master edge controller to a second edge controller for running, and instructing the second edge controller to send first field data obtained using each of the transferred preprocessing algorithms to the cloud platform, the load of the second edge controller being lower than a preset second load threshold, the second load threshold being lower than the second load threshold;

the message sending module is further configured to send the load transfer instruction generated by the load balancing module to the second master edge controller and the second edge controller.

In a fourth aspect, an embodiment of the present invention further provides another cloud platform, comprising: at least one memory and at least one processor;

the at least one memory is configured to store a machine-readable program;

the at least one processor is configured to invoke the machine-readable program to execute the method provided by the first aspect and any possible implementation manner of the first aspect.

In a fifth aspect, an embodiment of the present invention further provides an edge controller, comprising:

a message receiving module configured to receive a control message from a cloud platform;

a controller identification module configured to judge whether the edge controller is a master edge controller according to the control message received by the message receiving module;

a data acquisition module configured to obtain second field data according to the control message when the controller identification module judges that the edge controller is a master edge controller, wherein the second field data are used for characterizing an operating state of at least one field apparatus, the second field data include field data collected by at least one edge controller, and the second field data include field data collected by the master edge controller;

a data preprocessing module configured to preprocess the second field data obtained by the data acquisition module to obtain first field data, wherein the first field data are used for the cloud platform to perform data analysis to obtain a first apparatus operation indicator corresponding to the control message;

a data sending module configured to send the first field data obtained by the data preprocessing module to the cloud platform;

a data collection module configured to, when the controller identification module determines that the edge controller is not a master edge controller, collect field data according to the control message, and send collected field data through the data sending module to the master edge controller indicated by the control message.

In the first possible implementation manner, according to the fifth aspect, the message receiving module is further configured to receive a preprocessing algorithm from the cloud platform, wherein the preprocessing algorithm corresponds to the first apparatus operation indicator;

the data preprocessing module is configured to, by using the preprocessing algorithm received by the message receiving module, preprocess the second field data obtained by the data acquisition module, so as to obtain the first field data.

In the second possible implementation manner, according to the fifth aspect, the message receiving module is further configured to receive an algorithm update instruction from the cloud platform;

the data preprocessing module is further configured to, according to the algorithm update instruction received by the message receiving module, replace the preprocessing algorithm previously used for preprocessing the second field data with a target preprocessing algorithm, so as to, by using the target preprocessing algorithm, preprocess the second field data obtained again.

In a third possible implementation manner, in combination with the fifth aspect and any one of the first possible implementation manner and the second possible implementation manner of the fifth aspect, the edge controller further comprises: a load transfer module;

the message receiving module is further configured to receive a load transfer instruction from the cloud platform;

the load transfer module is configured to identify whether the edge controller is a second master edge controller or second edge controller indicated by the load transfer instruction received by the message receiving module, and, if the edge controller is the second master edge controller indicated by the load transfer instruction, then transfer at least one preprocessing algorithm running on the edge controller to a second edge controller, so that the second edge controller obtains first field data by using each of the transferred preprocessing algorithms, respectively, and sends the obtained first field data to the cloud platform, wherein the load of the second edge controller is lower than a preset second load threshold, if the edge controller is the second edge controller indicated by the load transfer instruction, then obtain at least one preprocessing algorithm that needs to be transferred as indicated by the load transfer instruction, and, for each of the preprocessing algorithms transferred, make the data acquisition module obtain the second field data that need to be preprocessed by the preprocessing algorithm, make the data preprocessing module preprocess the obtained second field data by using the preprocessing algorithm to obtain first field data, and make the data sending module send the obtained first field data to the cloud platform.

In a sixth aspect, an embodiment of the present invention further provides another edge controller, comprising: at least one memory and at least one processor;

the at least one memory is configured to store a machine-readable program;

the at least one processor is configured to invoke the machine-readable program to execute the method provided by the second aspect and any possible implementation manner of the second aspect.

In a seventh aspect, an embodiment of the present invention further provides a field data transmission system, comprising: one of any type of cloud platforms provided by the third aspect, any possible implementation manner of the third aspect, and the fourth aspect, and at least two of any type of edge controllers provided by the fifth aspect, any one possible implementation manner of the fifth aspect, and the sixth aspect.

In a first possible implementation manner, according to the seventh aspect, the field data transmission system further comprises: at least one gateway;

each of the gateways is respectively connected to the cloud platform and at least one of the edge controllers;

each of the gateways is configured to transmit communication data between the connected edge controller and the gateway.

In an eighth aspect, an embodiment of the present invention further provides a computer-readable medium having a computer instruction stored thereon, wherein the computer instruction, when executed by a processor, causes the processor to execute a method provided by the first aspect, any possible implementation manner of the first aspect, the second aspect, and any possible implementation manner of the second aspect.

According to the above-described technical solutions, a cloud platform can determine a corresponding master edge controller for each apparatus operation indicator by sending a control message, after a master edge controller receives a control message of the same apparatus operation indicator corresponding thereto, the master edge controller can collect field data according to the control message, and can receive field data sent by another edge controller according to the control message, then the master edge controller can preprocess the above-mentioned two types of field data to obtain first field data and send the obtained first field data to the cloud platform, and then the cloud platform can perform data analysis on the received first field data to obtain corresponding apparatus operation indicators. It is thus clear that a corresponding master edge controller is set for each apparatus operation indicator, and that the master edge controller sends, in a centralized manner, the field data required for analyzing the corresponding apparatus operation indicator to the cloud platform, so that the cloud platform can directly use the received data in analyzing the corresponding apparatus operation indicator, without the need for searching a great mass of field data for the field data required for analyzing the apparatus operation indicator, which saves the computing resources required for data search, thereby allowing a reduction in the cost of field data analysis with the cloud platform.

DETAILED DESCRIPTION

Figure 1:
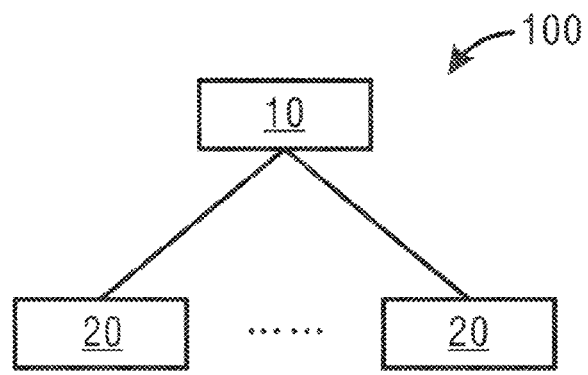
FIG. 1 is a schematic diagram of a field data transmission system provided by an embodiment of the present invention.

Against the above-mentioned background, a field data transmission method, device and system, and a computer-readable medium provided by embodiments of the present invention allow a reduction in the costs of analyzing field data with a cloud platform.

In a first aspect, an embodiment of the present invention provides a field data transmission method, comprising:

determining, with one cloud platform, at least one first apparatus operation indicator that needs to be obtained by data analysis;

for each of the first apparatus operation indicators, generating, with the cloud platform, a control message for the first apparatus operation indicator, wherein the control message is used for determining a master edge controller from at least one edge controller, the master edge controller is used for sending first field data to the cloud platform, the first field data are used for the cloud platform to perform data analysis to obtain the first apparatus operation indicator, the first field data are obtained by preprocessing second field data with the master edge controller, the second field data are collected by at least one of the edge controllers, and the second field data are used for characterizing an operating state of at least one field apparatus;

sending, with the cloud platform, each of the control messages to each of the edge controllers, respectively;

receiving, with the cloud platform, the first field data from each of the master edge controllers, respectively.

In a first possible implementation manner, according to the first aspect, said determining of at least one first apparatus operation indicator that needs to be obtained by data analysis comprises:

performing data analysis on third field data from the at least one edge controller to obtain a numerical value of at least one second apparatus operation indicator, wherein the time when the cloud platform receives the third field data is earlier than the time when the first field data are received;

judging respectively whether the numerical value of each of the second apparatus operation indicators is within a corresponding normal value range;

if the numerical value of at least one of the second apparatus operation indicators is outside the corresponding normal value range, then determining at least one of the first apparatus operation indicators according to the value of each of the second apparatus operation indicators, wherein the first apparatus operation indicator is different from the second apparatus operation indicator.

In a second possible implementation manner, according to the first aspect, for each of the first apparatus operation indicators, after generating, with the cloud platform, a control message for the first apparatus operation indicator, the method further comprises:

for each of the first apparatus operation indicators, determining, with the cloud platform, a preprocessing algorithm corresponding to the first apparatus operation indicator, wherein the preprocessing algorithm is used for a first master edge controller to preprocess the second field data into the first field data, and the first master edge controller is configured to send the first field data required for data analysis of the first apparatus operation indicator to the cloud platform;

sending, with the cloud platform, the preprocessing algorithm to the first master edge controller.

In a third possible implementation manner, according to the first aspect, after said receiving of the first field data from each of the master edge controllers respectively, the method further comprises:

for each of the master edge controllers, performing data analysis on the first field data from the master edge controller to obtain a corresponding numerical value of the first apparatus operation indicator;

judging whether the numerical value of the first apparatus operation indicator is abnormal;

if the numerical value of the first apparatus operation indicator is abnormal, then determining an algorithm update instruction according to the numerical value of the first apparatus operation indicator, wherein the algorithm update instruction is used for instructing the master edge controller to preprocess the second field data obtained later according to a target preprocessing algorithm;

sending the algorithm update instruction to the master edge controller.

In a fourth possible implementation manner, in combination with the first aspect and any one of the first possible implementation manner, the second possible implementation manner, and the third possible implementation manner of the first aspect, after said receiving of the first field data from each of the master edge controllers respectively, the method further comprises:

for each of the master edge controllers, determining the load of the master edge controller according to the data amount and relationship between data of the first field data from the master edge controller, the number and complexity of the preprocessing algorithms run by the master edge controller, wherein at least one of the preprocessing algorithms is run on the master edge controller, and the different preprocessing algorithms are used for processing the different second field data into the corresponding first field data;

determining, from each of the master edge controllers, a second master edge controller with the largest load;

judging whether the load of the second master edge controller is higher than a preset first load threshold;

if the load of the second master edge controller is higher than the first load threshold, then generating a load transfer instruction, wherein the load transfer instruction is used for transferring at least one of the preprocessing algorithms running on the second master edge controller to a second edge controller for running, and instructing the second edge controller to send first field data obtained using each of the transferred preprocessing algorithms to the cloud platform, the load of the second edge controller being lower than a preset second load threshold, the second load threshold being lower than the second load threshold;

sending the load transfer instruction to the second master edge controller and the second edge controller.

In a second aspect, an embodiment of the present invention provides another field data transmission method, comprising:

receiving, with an edge controller, a control message from a cloud platform;

judging whether the edge controller is a master edge controller according to the control message;

if the edge controller is a master edge controller, then obtaining second field data according to the control message, wherein the second field data are used for characterizing an operating state of at least one field apparatus, the second field data include field data collected by at least one edge controller, and include field data collected by the master edge controller, and the second field data are preprocessed to obtain first field data, wherein the first field data are used for the cloud platform to perform data analysis to obtain a first apparatus operation indicator corresponding to the control message, and to send the first field data to the cloud platform; if the edge controller is not a master edge controller, then collecting field data according to the control message and sending collected field data to the master edge controller indicated by the control message.

In a first possible implementation manner, according to the second aspect, before said preprocessing of the second field data to obtain first field data, the method further comprises: receiving a preprocessing algorithm from the cloud platform, wherein the preprocessing algorithm corresponds to the first apparatus operation indicator; correspondingly, said preprocessing of the second field data to obtain first field data comprises: preprocessing the second field data by using the preprocessing algorithm to obtain the first field data.

In a second possible implementation manner, according to the second aspect, after said sending of the first field data to the cloud platform, the method further comprises:

receiving an algorithm update instruction from the cloud platform;

according to the algorithm update instruction, replacing, with a target preprocessing algorithm, the preprocessing algorithm previously used for preprocessing the second field data, so as to, by using the target preprocessing algorithm, preprocess the second field data obtained again.

In a third possible implementation manner, in combination with the second aspect and any one of the first possible implementation manner and the second possible implementation manner of the second aspect, after sending the first field data to the cloud platform, the method further comprises:

receiving a load transfer instruction from the cloud platform;

identifying whether the edge controller is a second master edge controller or second edge controller indicated by the load transfer instruction;

if the edge controller is the second master edge controller indicated by the load transfer instruction, then transferring at least one preprocessing algorithm running on the edge controller to a second edge controller, so that the second edge controller obtains first field data by using each of the transferred preprocessing algorithms respectively, and sends the obtained first field data to the cloud platform, wherein the load of the second edge controller is lower than a preset second load threshold;

if the edge controller is the second edge controller indicated by the load transfer instruction, then obtaining at least one preprocessing algorithm indicated by the load transfer instruction that needs to be transferred, obtaining, for each of the transferred preprocessing algorithms, the second field data that need to be preprocessed by the preprocessing algorithm, preprocessing the obtained second field data by using the preprocessing algorithm to obtain first field data, and sending the obtained first field data to the cloud platform.

In a third aspect, an embodiment of the present invention provides a cloud platform, comprising:

an indicator determination module configured to determine at least one first apparatus operation indicator that needs to be obtained by data analysis;

a message generation module configured to generate, for each of the first apparatus operation indicators determined by the indicator determination module, a control message for the first apparatus operation indicator, wherein the control message is used for determining a master edge controller from at least one edge controller, the master edge controller is used for sending first field data to the cloud platform, the first field data are used for the cloud platform to perform data analysis to obtain the first apparatus operation indicator, the first field data are obtained by preprocessing second field data with the master edge controller, the second field data are collected by at least one of the edge controllers, and the second field data are used for characterizing an operating state of at least one field apparatus;

a message sending module configured to send each of the control messages generated by the message generation module to each of the edge controllers respectively;

a data receiving module configured to receive the first field data from each of the master edge controllers respectively, wherein each of the master edge controllers is determined by each of the control messages generated by the message generation module.

In a first possible implementation manner, according to the third aspect, the indicator determination module comprises:

a data analysis unit configured to perform data analysis on third field data from the at least one edge controller, and obtain at least one numerical value of a second apparatus operation indicator, wherein the time when the cloud platform receives the third field data is earlier than the time when the first field data are received;

a numerical value judgment unit configured to respectively judge whether the numerical value of each of the second apparatus operation indicators obtained by the data analysis unit is within a corresponding normal value range;

an indicator screening unit configured to, when the numerical value judgment unit determines that the numerical value of at least one of the second apparatus operation indicators is outside the corresponding normal value range, determine at least one of the first apparatus operation indicators according to the value of each of the second apparatus operation indicators, wherein the first apparatus operation indicator is different from the second apparatus operation indicator.

In a second possible implementation manner, according to the third aspect, the cloud platform further comprises: an algorithm determination module;

the algorithm determination module is configured to, for each of the first apparatus operation indicators determined by the indicator determination module, determine a preprocessing algorithm corresponding to the first apparatus operation indicator, wherein the preprocessing algorithm is used for a first master edge controller to preprocess the second field data into the first field data, and the first master edge controller is configured to send the first field data required for data analysis of the first apparatus operation indicator to the cloud platform;

the message sending module is further configured to send the preprocessing algorithm determined by the algorithm determination module to the first master edge controller.

In a third possible implementation manner, according to the third aspect, the cloud platform further comprises: an algorithm update module;

the algorithm update module is configured to, for each of the master edge controllers, perform data analysis on the first field data from the master edge controller that are received by the data receiving module, obtain the numerical value of the corresponding first apparatus operation indicator, judge whether the numerical value of the first apparatus operation indicator is abnormal, and, if the numerical value of the first apparatus operation indicator is abnormal, then determine an algorithm update instruction according to the numerical value of the first apparatus operation indicator, wherein the algorithm update instruction is used for instructing the master edge controller to preprocess the second field data obtained later according to a target preprocessing algorithm;

the message sending module is further configured to send the algorithm update instruction generated by the algorithm update module to the corresponding master edge controller.

In a fourth possible implementation manner, in combination with the third aspect and any one of the first possible implementation manner, the second possible implementation manner and the third possible implementation manner of the third aspect, the cloud platform further comprises: a load balancing module;

the load balancing module is configured to, for each of the master edge controllers, determine the load of the master edge controller according to the data amount and relationship between data of the first field data received by the data receiving module from the master edge controller, the number and complexity of the preprocessing algorithms run by the edge controller, wherein at least one of the preprocessing algorithms is run on the master edge controller, and the different preprocessing algorithms are used for processing the different second field data into the corresponding first field data, determining, from each of the master edge controllers, a second master edge controller with the largest load, judging whether the load of the second master edge controller is higher than a preset first load threshold, and, if the load of the second master edge controller is higher than the first load threshold, then generating a load transfer instruction, wherein the load transfer instruction is used for transferring at least one of the preprocessing algorithms running on the second master edge controller to a second edge controller for running, and instructing the second edge controller to send first field data obtained using each of the transferred preprocessing algorithms to the cloud platform, the load of the second edge controller being lower than a preset second load threshold, the second load threshold being lower than the second load threshold;

the message sending module is further configured to send the load transfer instruction generated by the load balancing module to the second master edge controller and the second edge controller.

In a fourth aspect, an embodiment of the present invention further provides another cloud platform, comprising: at least one memory and at least one processor;

the at least one memory is configured to store a machine-readable program;

the at least one processor is configured to invoke the machine-readable program to execute the method provided by the first aspect and any possible implementation manner of the first aspect.

In a fifth aspect, an embodiment of the present invention further provides an edge controller, comprising:

a message receiving module configured to receive a control message from a cloud platform;

a controller identification module configured to judge whether the edge controller is a master edge controller according to the control message received by the message receiving module;

a data acquisition module configured to obtain second field data according to the control message when the controller identification module judges that the edge controller is a master edge controller, wherein the second field data are used for characterizing an operating state of at least one field apparatus, the second field data include field data collected by at least one edge controller, and the second field data include field data collected by the master edge controller;

a data preprocessing module configured to preprocess the second field data obtained by the data acquisition module to obtain first field data, wherein the first field data are used for the cloud platform to perform data analysis to obtain a first apparatus operation indicator corresponding to the control message;

a data sending module configured to send the first field data obtained by the data preprocessing module to the cloud platform;

a data collection module configured to, when the controller identification module determines that the edge controller is not a master edge controller, collect field data according to the control message, and send collected field data through the data sending module to the master edge controller indicated by the control message.

In the first possible implementation manner, according to the fifth aspect, the message receiving module is further configured to receive a preprocessing algorithm from the cloud platform, wherein the preprocessing algorithm corresponds to the first apparatus operation indicator;

the data preprocessing module is configured to, by using the preprocessing algorithm received by the message receiving module, preprocess the second field data obtained by the data acquisition module, so as to obtain the first field data.

In the second possible implementation manner, according to the fifth aspect, the message receiving module is further configured to receive an algorithm update instruction from the cloud platform;

the data preprocessing module is further configured to, according to the algorithm update instruction received by the message receiving module, replace the preprocessing algorithm previously used for preprocessing the second field data with a target preprocessing algorithm, so as to, by using the target preprocessing algorithm, preprocess the second field data obtained again.

In a third possible implementation manner, in combination with the fifth aspect and any one of the first possible implementation manner and the second possible implementation manner of the fifth aspect, the edge controller further comprises: a load transfer module;

the message receiving module is further configured to receive a load transfer instruction from the cloud platform;

the load transfer module is configured to identify whether the edge controller is a second master edge controller or second edge controller indicated by the load transfer instruction received by the message receiving module, and, if the edge controller is the second master edge controller indicated by the load transfer instruction, then transfer at least one preprocessing algorithm running on the edge controller to a second edge controller, so that the second edge controller obtains first field data by using each of the transferred preprocessing algorithms, respectively, and sends the obtained first field data to the cloud platform, wherein the load of the second edge controller is lower than a preset second load threshold, if the edge controller is the second edge controller indicated by the load transfer instruction, then obtain at least one preprocessing algorithm that needs to be transferred as indicated by the load transfer instruction, and, for each of the preprocessing algorithms transferred, make the data acquisition module obtain the second field data that need to be preprocessed by the preprocessing algorithm, make the data preprocessing module preprocess the obtained second field data by using the preprocessing algorithm to obtain first field data, and make the data sending module send the obtained first field data to the cloud platform.

In a sixth aspect, an embodiment of the present invention further provides another edge controller, comprising: at least one memory and at least one processor;

the at least one memory is configured to store a machine-readable program;

the at least one processor is configured to invoke the machine-readable program to execute the method provided by the second aspect and any possible implementation manner of the second aspect.

In a seventh aspect, an embodiment of the present invention further provides a field data transmission system, comprising: one of any type of cloud platforms provided by the third aspect, any possible implementation manner of the third aspect, and the fourth aspect, and at least two of any type of edge controllers provided by the fifth aspect, any one possible implementation manner of the fifth aspect, and the sixth aspect.

In a first possible implementation manner, according to the seventh aspect, the field data transmission system further comprises: at least one gateway;

each of the gateways is respectively connected to the cloud platform and at least one of the edge controllers;

each of the gateways is configured to transmit communication data between the connected edge controller and the gateway.

In an eighth aspect, an embodiment of the present invention further provides a computer-readable medium having a computer instruction stored thereon, wherein the computer instruction, when executed by a processor, causes the processor to execute a method provided by the first aspect, any possible implementation manner of the first aspect, the second aspect, and any possible implementation manner of the second aspect.

According to the above-described technical solutions, a cloud platform can determine a corresponding master edge controller for each apparatus operation indicator by sending a control message, after a master edge controller receives a control message of the same apparatus operation indicator corresponding thereto, the master edge controller can collect field data according to the control message, and can receive field data sent by another edge controller according to the control message, then the master edge controller can preprocess the above-mentioned two types of field data to obtain first field data and send the obtained first field data to the cloud platform, and then the cloud platform can perform data analysis on the received first field data to obtain corresponding apparatus operation indicators. It is thus clear that a corresponding master edge controller is set for each apparatus operation indicator, and that the master edge controller sends, in a centralized manner, the field data required for analyzing the corresponding apparatus operation indicator to the cloud platform, so that the cloud platform can directly use the received data in analyzing the corresponding apparatus operation indicator, without the need for searching a great mass of field data for the field data required for analyzing the apparatus operation indicator, which saves the computing resources required for data search, thereby allowing a reduction in the cost of field data analysis with the cloud platform.

| List of reference numbers: | | |
|---|---|---|
| 100: Field data transmission system | 10: Cloud platform | 20: Edge controller |
| 30: Gateway | 101: Indicator determination module | 102: Message generation module |
| 103: Message sending module | 104: Data receiving module | 1011: |
| 1012: | 1013: | 105: Algorithm determination module |
| 106: Algorithm update module | 107: Load balancing module | 40: Cloud platform |
| 108: Memory | 109: Processor | 201: Message receiving module |
| 202: Controller identification module | 203: Data acquisition module | 204: Data preprocessing module |
| 205: Data sending module | 206: Data collection module | 207: Load transfer module |
| 50: Edge controller | 208: Memory | 209: Controller |
| 60: Production line | 210: Data control service module | 110: Data analysis module |
| 111: Edge management module | | |
| 301: Determine at least one first apparatus operation indicator that needs to be obtained by data analysis | | |
| 302: For each first apparatus operation indicator, generate a control message for the first apparatus operation indicator | | |
| 303: Send each control message to each edge controller respectively | | |
| 304: Receive first field data from each master edge controller | | |
| 401: Perform data analysis on third field data to obtain the numerical value of at least one second apparatus operation indicator | | |
| 402: Judge whether the numerical value of each second device operation indicator is within a corresponding normal value range | | |
| 403: Determine at least one first apparatus operation indicator according to the numerical value of each second apparatus operation indicator | | |
| 501: For each first apparatus operation indicator, determine a preprocessing algorithm corresponding to the first apparatus operation indicator | | |
| 502: Send the preprocessing algorithm to a first master edge controller | | |
| 601: Perform data analysis on first field data to obtain the numerical value of the corresponding first apparatus operation indicator | | |
| 602: Judge whether the obtained numerical value of the first apparatus operation indicator is abnormal | | |
| 603: If the numerical value of the first apparatus operation indicator is abnormal, determine an algorithm update instruction according to the numerical value of the first apparatus operation indicator | | |
| 604: Send the algorithm update instruction to the master edge controller | | |
| 701: For each master edge controller, determine the load of the master edge controller, | | |

-continued

List of reference numbers:

702: Determine the second master edge controller with the largest load from each master edge controller
703: Judge whether the load of the second master edge controller is higher than a preset first load threshold
704: If the load of the second master edge controller is higher than the first load threshold, generate a load transfer instruction
705: Send the load transfer instruction to the second master edge controller and the second edge controller
801: Receive a control message from a cloud platform
802: Judge whether the current edge controller is a master edge controller according to the control message
803: Obtain second field data according to the control message
804: Preprocess the second field data to obtain the first field data
805: Send the first field data to a cloud platform, and end the current flow
806: Send the field data collected according to the control message to the master edge controller indicated by the main control message
901: Receive a load transfer instruction from the cloud platform
902: Identify whether the current edge controller is the first master edge controller indicated by the load transfer instruction
903: Transfer at least one preprocessing algorithm running on the current edge controller to a second edge controller
904: Identify whether the current edge controller is the second edge controller indicated by the load transfer instruction
905: Obtain at least one preprocessing algorithm indicated by the load transfer instruction that needs to be transferred
906: For a transferred preprocessing algorithm, obtain the second field data that need to be preprocessed by the preprocessing algorithm
907: Preprocess the corresponding second field data by using the transferred preprocessing algorithm to obtain first field data
908: Send the obtained first field data to the cloud platform, and end the current flow
909: End the current flow As mentioned above, each edge controller sends collected field data to a cloud platform, the cloud platform uses the received field data to analyze one or more apparatus operation indicators, however, when analyzing an apparatus operation indicator, a cloud platform may require field data from different edge controllers, and, therefore, for each apparatus operation indicator, a cloud platform needs to find required field data from the field data from each edge controller, and then analyze the found field data to obtain the corresponding apparatus operation indicator, wherein, however, searching all field data for required field data consumes a lot of computing resources, which in turn leads to a high cost in field data analysis with a cloud platform.

In an embodiment of the present invention, for each apparatus operation indicator that needs to be analyzed, the cloud platform can generate a control message corresponding to the apparatus operation indicator, after the control message is sent to each edge controller, a master edge controller corresponding to the apparatus operation indicator may be determined, the master edge controller can receive field data collected by another edge controller, preprocess the received field data and the field data collected by itself, and then obtain the first field data used by the cloud platform to perform data analysis on the apparatus operation indicator, and then the master edge controller can send the obtained first field data to the cloud platform, so that the cloud platform performs data analysis on the apparatus operation indicator. It is thus clear that a corresponding master edge controller is set for each apparatus operation indicator, a master edge controller can collect field data required for analyzing the corresponding apparatus operation indicator, and then send the collected field data to the cloud platform, and the cloud platform can directly use the received field data to perform data analysis on the corresponding apparatus operation indicator, so that the cloud platform no longer needs to search a great mass of field data for the field data required for data analysis of the apparatus operation indicator, which saves the computing resources required by the cloud platform for data search, thereby allowing a reduction in the cost of field data analysis with the cloud platform.

A field data transmission method, system, cloud platform, and edge controller provided by embodiments of the present invention will be described in detail below with reference to the drawings.

As shown in FIG. 1, an embodiment of the present invention provides a field data transmission system 100, comprising: one cloud platform 10 and at least two edge controllers 20;

the cloud platform 10 determines at least one first apparatus operation indicator that needs to be obtained by data analysis, generates a corresponding control message for each apparatus operation indicator, and then sends the generated control message to each edge controller 20;

after receiving a control message, the edge controller 20 determines whether it is a master edge controller indicated by the control message, and if the control message indicates that the edge controller 20 is a master edge controller, the edge controller 20 obtains second field data, obtains first field data by preprocessing the second field data, and then sends the first field data to the cloud platform 10, wherein the second field data include field data collected by the edge controller according to the control message and field data sent by another edge controller to the edge controller 20 according to the control message.

In an embodiment of the present invention, a cloud platform can determine a corresponding master edge controller for each apparatus operation indicator by sending a control message, after a master edge controller receives a control message of the same apparatus operation indicator corresponding thereto, the master edge controller can collect field data according to the control message, and can receive field data sent by another edge controller according to the control message, then the master edge controller can preprocess the above-mentioned two types of field data to obtain first field data and send the obtained first field data to the cloud platform, and then the cloud platform can perform data analysis on the received first field data to obtain corresponding apparatus operation indicators. It is thus clear that a corresponding master edge controller is set for each apparatus operation indicator, and that the master edge controller sends, in a centralized manner, the field data required for analyzing the corresponding apparatus operation indicator to the cloud platform, so that the cloud platform can directly use the received data in analyzing the corresponding apparatus operation indicator, without the need for searching a great mass of field data for the field data required for analyzing the apparatus operation indicator, which saves the computing resources required for data search, thereby allowing a reduction in the cost of field data analysis with the cloud platform.

In an embodiment of the present invention, after an edge controller 20 receives a control message from the cloud platform 10, the edge controller 20 may adopt one of the following three handling modes depending on the content of the control message:

Handling mode 1: Obtain second field data, preprocess the second field data to obtain first field data, and send the first field data to a cloud platform.

Specifically, when the received control message indicates that the edge controller 20 is a master edge controller, the edge controller 20 obtains second field data, wherein the second field data include field data collected by the edge controller 20 according to the control message and field data received by the edge controller 20 and sent by another edge controller 20 according to the control message, then the edge controller 20 preprocesses the second field data to obtain first field data, and sends the obtained first field data to the cloud platform 10.

Handling mode 2: Collect field data according to the control message, and send the collected field data to the master edge controller indicated by the control message.

Specifically, when the received control message indicates that the edge controller 20 is not a master edge controller, but indicates that the edge controller 20 needs to collect data and send the collected data to the corresponding master edge controller, the edge controller 20 collects field data according to the control message, and sends the collected field data to the master edge controller indicated by the control message.

Further, a control message generated by the cloud platform 10 comprises not only the identifier of a master edge controller, but also the identifier of each slave edge controller that needs to send field data to the master edge controller, and, in addition, a control message also comprises a rule for a master edge controller to collect field data and a rule for each slave edge controller to collect field data. After receiving a control message, an edge controller 20, according to the identifier of a master edge controller and the identifier of a slave edge controller included in the control message, determines whether it is necessary to participate in the field data collection activity defined by the control message.

Handling mode 3: Ignore the received control message.

Specifically, when the received control message does not include the identifier of the edge controller 20, which means that the edge controller 20 is neither a master edge controller corresponding to the control message nor a slave edge controller that needs to transmit field data to the master edge controller corresponding to the control message, the edge controller 20 does not need to participate in the field data collection activity defined by the control message and thus ignores the control message.

In an embodiment of the present invention, the cloud platform 10 may determine a plurality of apparatus operation indicators each having a corresponding master edge controller, the field data required for analyzing one apparatus operation indicator may come from different edge controllers, so the same edge controller 20 may be used as the master edge controller corresponding to a plurality of apparatus operation indicators; in addition, the same edge controller 20 may also be used as the slave edge controller corresponding to a plurality of apparatus operation indicators, and, further, the same edge controller 20 may also be used as the master edge controller and the slave edge controller corresponding to a plurality of apparatus operation indicators at the same time.

For example, the cloud platform is connected to 5 edge controllers, and the 5 edge controllers are edge controllers 1 to 5, respectively. The cloud platform determines 3 apparatus operation indicators, wherein analysis of apparatus operation indicator 1 requires field data collected by the edge controller 1, analysis of apparatus operation indicator 2 requires field data collected by the edge controller 1 and the edge controller 2, and analysis of apparatus operation indicator 3 requires field data collected by the edge controllers 2 to 5. According to the field data required to analyze each apparatus operation indicator, the cloud platform configures the edge controller 1 as the master edge controller corresponding to the apparatus operation indicator 1, and the apparatus operation indicator 1 has no corresponding slave edge controller; the cloud platform configures the edge controller 1 as the master edge controller corresponding to the apparatus operation indicator 2, and configures the edge controller 2 as the slave edge controller corresponding to the apparatus operation indicator 2; the cloud platform configures the edge controller 2 as the master edge controller corresponding to the apparatus operation indicator 3, and configures the edge controllers 3 to 5 as slave edge controllers corresponding to the apparatus operation indicator 3. It is thus clear that the edge controller 1 functions as the master edge controller corresponding to the apparatus operation indicator 1 and the apparatus operation indicator 2 at the same time, the edge controller 2 functions as the slave edge controller corresponding to the apparatus operation indicator 2 and the apparatus operation indicator 3 at the same time, the edge controller 3 functions as only the master edge controller corresponding to the apparatus operation indicator 3, and the edge controller 4 and the edge controller 5 function as only the slave edge controllers corresponding to the apparatus operation indicator 3.

Figure 2:
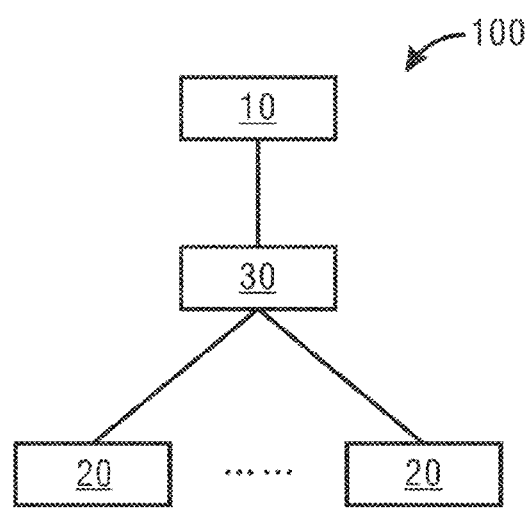
FIG. 2 is a schematic diagram of another field data transmission system provided by an embodiment of the present invention.

Optionally, on the basis of the field data transmission system 100 shown in the figure, as shown in FIG. 2, the field data transmission system 100 may further comprise: at least one gateway 30;

each gateway 30 is connected to the cloud platform 10 and at least one edge controller 20, respectively;

the gateway 30 is configured to transmit communication data between each of the connected edge controllers 20 and the cloud platform 10.

In an embodiment of the present invention, the edge controller 20 functioning as a master edge controller can send first field data to the cloud platform 10 through the connected gateway 30, and the cloud platform 10 can send a control message, a preprocessing algorithm, and another control instruction to each edge controller 20 through the gateway 30, ensuring that the cloud platform 10 and an edge controller 20 can communicate with each other conveniently and reliably.

In an embodiment of the present invention, the gateway 30 may be a dedicated intelligent gateway or a common gateway. When the gateway 30 is a common gateway, an agent program may be deployed in the common gateway, wherein the agent program receives data from an edge controller 20 and sends it to the cloud platform 10, and the agent program receives data sent by the cloud platform 10 and forwards it to the corresponding edge controller 20, thus ensuring that the gateway 30 can normally transmit communication data between the cloud platform 10 and the edge controller 20.

Optionally, on the basis of the field data transmission system 100 shown in FIG. 1, for each apparatus operation indicator determined by the cloud platform 10, after the cloud platform 10 sends each edge controller 20 a control message corresponding to the apparatus operation indicator, the cloud platform 10 may also send a preprocessing algorithm to the master edge controller corresponding to the apparatus operation indicator. Correspondingly, for each apparatus operation indicator, after the edge controller 20, which functions as the master edge controller corresponding to the apparatus operation indicator, receives a control message from the cloud platform 10, the edge controller 20 can also receive a preprocessing algorithm from the cloud platform 10, and then the edge controller 20 can use the received preprocessing algorithm to preprocess obtained second field data, thus obtaining the first field data for analyzing the apparatus operation indicator.

In an embodiment of the present invention, after a cloud platform configures an edge controller as the master edge controller corresponding to an apparatus operation indicator, the cloud platform can further send a preprocessing algorithm to the edge controller, and then the edge controller can process second field data using the received preprocessing algorithm to obtain first field data for analyzing the apparatus operation indicator. It is thus clear that a cloud platform, by sending a preprocessing algorithm to a master edge controller, allows the master edge controller to preprocess second field data to obtain first field data, so that the cloud platform can directly use the first field data for data analysis, and the preprocessing of field data is completed by the master edge controller, which reduces the amount of data that need to be processed when the cloud platform analyzes field data, thereby lessening the computing performance requirements on the cloud platform. In addition, since the master edge controller preprocesses field data, the data amount of the field data sent to the cloud platform may be reduced, which can not only reduce the cost of transmitting the field data, but also cut the cost of field data storage with a cloud platform.

Optionally, on the basis of the field data transmission system 100 shown in FIG. 1, after receiving first field data from a master edge controller, the cloud platform 10 can obtain the numerical value of the corresponding apparatus operation indicator by performing data analysis on the first field data, then the cloud platform 10 can judge whether the apparatus operation indicator is abnormal according to the obtained numerical value, and, if the apparatus operation indicator is abnormal, the cloud platform 10 can send an algorithm update instruction to the master edge controller according to the abnormal apparatus operation indicator. After receiving an algorithm update instruction from the cloud platform 10, the master edge controller replaces the previously used preprocessing algorithm with a target preprocessing algorithm according to the algorithm update instruction, and then, by using the target preprocessing algorithm, processes the re-obtained second field data to obtain the first field data.

In an embodiment of the present invention, after a cloud platform obtains the corresponding apparatus operation indicator by performing data analysis on the first field data, the cloud platform can determine whether the apparatus operation indicator is abnormal, and, if the apparatus operation indicator is abnormal, the preprocessing algorithm used by the corresponding edge controller may need to be updated, in which case the cloud platform sends an algorithm update instruction to the master edge controller, so that the master edge controller performs preprocessing according to a target preprocessing algorithm. It is thus clear that when the cloud platform determines that an apparatus operation indicator is abnormal, the cloud platform can, by sending an algorithm update instruction, update the preprocessing algorithm used by the master edge controller, thereby flexibly changing the rule for the master edge controller to preprocess field data, which improves the cloud platform with greater flexibility in field data analysis.

Optionally, on the basis of the field data transmission system 100 shown in FIG. 1, the cloud platform 10, according to the data amount of the first field data from each master edge controller and the relationship between the data, and the number and complexity of the processing algorithms run by each master edge controller, can determine the load of each master edge controller, respectively, and, when the load of a second master edge controller with the largest load is higher than a preset first load threshold, the cloud platform 10 can send a load transfer instruction to the second master edge controller and a second edge controller whose load is lower than a second load threshold. After receiving the load transfer instruction, the second master edge controller, according to the load transfer instruction, transfers at least one preprocessing algorithm running thereon to the second edge controller for running. After receiving the load transfer instruction, for each transferred preprocessing algorithm, the second edge controller obtains the second field data corresponding to the preprocessing algorithm, preprocesses the obtained second field data to obtain first field data, and sends the obtained first field data to the cloud platform 10.

In an embodiment of the present invention, the cloud platform can detect the load of each edge controller, and when the load of an edge controller exceeds a preset first load threshold, transfer one or more preprocessing algorithms running on the edge controller to another edge controller whose load is lower, so as to balance the load of each edge controller, ensure that each edge controller can properly collect and send field data, and ensure real-time transmission of field data.

In an embodiment of the present invention, after one or more preprocessing algorithms running on one master edge controller are transferred to another edge controller, the edge controller that receives the transferred preprocessing algorithms becomes the new master edge controller that is used to receive data sent by another edge controller, preprocesses field data using the transferred preprocessing algorithms, and sends the first field data obtained after the preprocessing to a cloud platform.

For example, the preprocessing algorithm 1 is used to obtain the first field data required to analyze the apparatus operation indicator 1, and the preprocessing algorithm 2 is used to obtain the first field data required to analyze the apparatus operation indicator 2, wherein, after the preprocessing algorithm 1 and preprocessing algorithm 2 running on the edge controller A are transferred to the edge controller B, the edge controller B becomes the master edge controller corresponding to the apparatus operation indicator 1 and the apparatus operation indicator 2, so that the edge controller B obtains the second field data inputted to the preprocessing algorithm 1 and the preprocessing algorithm 2, and sends the first field data outputted by the preprocessing algorithm 1 and the preprocessing algorithm 2 to the cloud platform. The edge controller A no longer runs the preprocessing algorithm 1 or the preprocessing algorithm 2, which means that the edge controller A no longer functions as the master edge controller corresponding to the apparatus operation indicator 1 and the apparatus operation indicator 2.

It should be noted that, in the above-described system embodiments and the method embodiments and devices described below, a first apparatus operation indicator is an indicator parameter that may be obtained by performing data analysis on field data, the numerical value of the first apparatus operation indicator may be obtained by performing data analysis on field data, and then an operating state of the corresponding field apparatus may be determined according to the numerical value of the first apparatus operation indicator, wherein, for example, the field data is the temperature of the fluid in the pipeline, the first apparatus operation indicator may be the pressure in the pipeline, and the pressure in the pipeline may be determined by performing data analysis on the temperature of the fluid in the pipeline.

In addition, it should be noted that, in the above-described system embodiments and method embodiments and devices described below, the cloud platform 10 obtains the numerical value of a second apparatus operation indicator by performing data analysis on third field data, then the first apparatus operation indicator is determined according to the numerical value of the second apparatus operation indicator, and, if the cloud platform 10 is defined to receive first field data in the current data transmission cycle, then the third field data are the field data received by the cloud platform 10 in the previous data transmission cycle. In a first circumstance, if the previous data transmission cycle is the initialization cycle of each edge controller 20, since no master edge controller has been determined, the third field data are the field data collected by each edge controller 20, and the third field data are sent to the cloud platform 10 by each edge controller 20, respectively. In a second circumstance, if each edge controller has completed initialization before the previous data transmission cycle, then the third field data are sent to the cloud platform 10 by each master edge controller in the previous data transmission cycle. When the field data have changed, the existing apparatus operation indicator may not be able to meet the goal of monitoring the operating state of a field apparatus, which, therefore, makes it necessary to update the apparatus operation indicators (including the addition, deletion, modification, etc. of an apparatus operation indicator), and whether the original apparatus operation indicator meets the monitoring requirements may be determined according to the numerical values of the apparatus operation indicators analyzed in the previous data transmission cycle, wherein, therefore, apparatus operation indicators change dynamically and, specifically, apparatus operation indicators for the current data transmission cycle are determined according to the numerical values of the apparatus operation indicators analyzed in the previous data transmission cycle.

It should also be noted that, in the above-described system embodiments and the method embodiments and devices described below, a master edge controller uses a preprocessing algorithm sent by the cloud platform 10 to preprocess the obtained second field data to obtain the first field data, wherein data preprocessing mainly comprises screening, filtering, cleaning, deduplication, etc. on second field data, and, certainly, a master edge controller may be made to perform more complex preprocessing algorithms, such as logic control operations, machine learning, big data processing, etc. on the second field data, according to the data processing capability of the edge controller 20.

A field data transmission method provided by an embodiment of the present invention will be described below from two aspects, namely, the cloud platform and the edge controller, respectively. Unless otherwise stated, a cloud platform involved in the following method embodiments may be the above-described cloud platform 10, an edge controller involved in the following method embodiments may be the above-described edge controller 20, and a gateway involved in the following method embodiments may be the above-described gateway 30.

Figure 3:
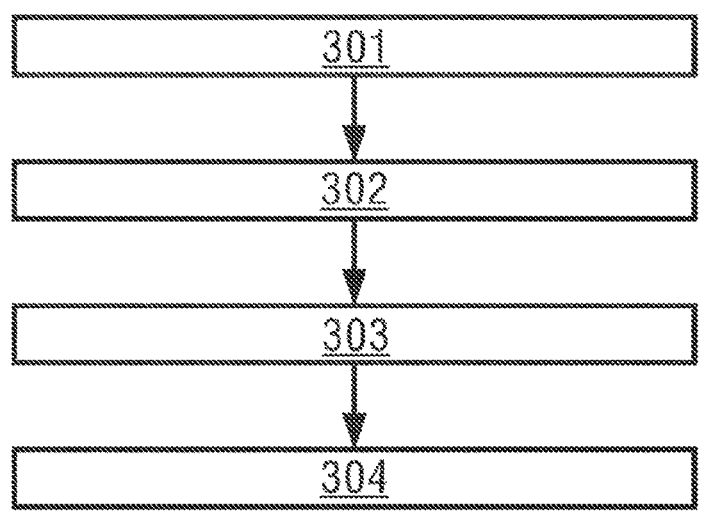
FIG. 3 is a flow chart of a field data transmission method according to an embodiment of the present invention.

In a field data transmission method provided by an embodiment of the present invention, the cloud platform may configure a corresponding master edge controller for each apparatus operation indicator that needs to be obtained by data analysis, and then the master edge controller sends the data formed by performing data analysis on the apparatus operation indicator to the cloud platform. As shown in FIG. 3, the field data transmission method performed by the cloud platform may comprise the following steps:

Step 301: Determine at least one first apparatus operation indicator that needs to be obtained by data analysis;

Step 302: For each first apparatus operation indicator, generate a control message for the first apparatus operation indicator, wherein the control message is used to determine the master edge controller corresponding to the first apparatus operation indicator from the at least one edge controller, the master edge controller is used to send the first field data to the cloud platform, the first field data are used for the cloud platform to perform analysis to obtain the first apparatus operation indicator, the first field data are obtained by preprocessing the second field data by the master edge controller, the second field data are collected by at least one edge controller, and the second field data are used for characterizing operating states of at least one field apparatus;

Step 303: Send each control message to each edge controller, respectively;

Step 304: Receive first field data from each master edge controller.

In an embodiment of the present invention, after the cloud platform determines at least one first apparatus operation indicator, the cloud platform sends a control message to each edge controller for each first apparatus operation indicator, so as to configure a corresponding master edge controller for each first apparatus operation indicator, so that the master edge controller can obtain the second field data and, by preprocessing the obtained second field data, obtain the first field data for analyzing the corresponding first apparatus operation indicator, and then the master edge controller uniformly sends the first field data to the cloud platform. It is thus clear that the cloud platform configures the corresponding master edge controller for each first apparatus operation indicator, the master edge controller uniformly sends the first field data used to analyze the corresponding first apparatus operation indicator to the cloud platform, the platform can directly perform data analysis on the received first field data to obtain the corresponding first apparatus operation indicators, and the cloud platform no longer needs to find the field data required for data analysis from the field data sent by each edge controller, which allows saving of the computing resources required by the cloud platform for data search, thereby reducing the cost of analyzing field data on the cloud platform.

Optionally, on the basis of the field data transmission method shown in FIG. 3, when the first apparatus operation indicator is determined in step 301, depending on when the first apparatus operation indicator is determined, the first apparatus operation indicator may be determined in one of two manners:

Manner 1: Determine at least one first apparatus operation indicator according to field data sent by each edge controller to the cloud platform;

Manner 2: Determine at least one first apparatus operation indicator according to field data sent by the master edge controller to the cloud platform.

The two different methods for determining the first apparatus operation indicator provided by the above-mentioned manners 1 and 2 will respectively be described below.

For manner 1:

When each edge controller initializes, since the cloud platform has not been configured with any master edge controller, each edge controller collects field data of the corresponding field apparatus according to a preset data collection rule, and preprocesses collected data according to a preset preprocessing method, after which each edge controller sends preprocessed field data to the cloud platform.

After receiving the field data of each edge controller, the cloud platform determines each pre-defined first apparatus operation indicator.

Figure 4:
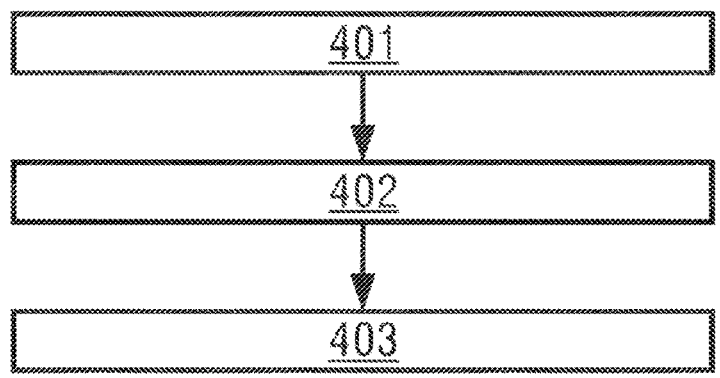
FIG. 4 is a flow chart of a method for determining a first apparatus operation indicator provided by an embodiment of the present invention.

For manner 2:

After each edge controller has initialized, the edge controller determined to be a master edge controller sends field data to the cloud platform according to a corresponding control message, and the cloud platform can determine the first apparatus operation indicator according to the received field data. As shown in FIG. 4, a method for determining the first apparatus operation indicator according to manner 2 may comprise the following steps:

Step 401: Perform data analysis on the third field data from at least one edge controller to obtain the numerical value of at least one second apparatus operation indicator, wherein the time when the cloud platform receives third field data is earlier than the time when the first field data are received;

Step 402: Determine whether the numerical value of each second apparatus operation indicator is within a corresponding normal value range;

Step 403: If the numerical value of at least one second apparatus operation indicator is outside the corresponding normal value range, determine at least one first apparatus operation indicator according to the numerical value of each second apparatus operation indicator, wherein the first apparatus operation indicator is different from the second apparatus operation indicator.

In an embodiment of the present invention, after the cloud platform configures a corresponding master edge controller for a determined apparatus operation indicator, the cloud platform receives field data sent by each master edge controller, and analyzes the received field data to obtain the numerical value of the corresponding apparatus operation indicator, after which the cloud platform can, according to the obtained apparatus operation indicator data, judge whether the required apparatus operation indicator needs to be changed, and, if yes, re-determine one or more apparatus operation indicators. A re-determined apparatus operation indicator can replace some or all of the previous apparatus operation indicators, or may be used as a supplement to the original apparatus operation indicators.

In an embodiment of the present invention, after determining first apparatus operation indicators, the cloud platform needs to configure a corresponding master edge controller for each the first apparatus operation indicator, and each master edge controller can aggregate field data collected by a plurality of edge controllers, preprocess the collected field data, and send the data to the cloud platform. It is thus clear that, fundamentally, the cloud platform allocates an edge controller group for each apparatus operation indicator, an edge controller group comprises a master edge controller, an edge controller group may further comprise one or more slave edge controllers, the slave edge controllers in the same edge controller group can collect corresponding field data and send them to the master edge controller, the master edge controller preprocesses field data collected by it and field data sent by the slave edge controllers in the same group and then sends the data to the cloud platform, and so the cloud platform can allocate different edge controller groups according to changes in field data, so as to flexibly change the method of combining the field data sent to the cloud platform, so that the cloud platform can change the data analysis method according to the changes in field data, ensuring that the operating state of the field apparatus may be learned in a more timely and effective manner.

For example, the cloud platform needs data collected by the edge controller 1, the edge controller 2, and the edge controller 3 to analyze the apparatus operation indicator 4, and the cloud platform configures the edge controller 1 as the master edge controller corresponding to the apparatus operation indicator 4. After receiving field data from the edge controller 1, the cloud platform obtains the numerical value of the apparatus operation indicator 4 by analyzing the field data from the edge controller 1, the cloud platform determines that the edge apparatus 2 is abnormal according to the numerical value of the apparatus operation indicator 4 and that it is necessary to increase the frequency of field data sampling for the edge apparatus 2, and, for this reason, the cloud platform determines an apparatus operation indicator 5, analysis of the apparatus operation indicator 5 requires field data of the edge apparatus that are collected by the edge controller 2, and then the cloud platform determines the controller 2 to be the master edge controller corresponding to the apparatus operation indicator 5, while the apparatus operation indicator 4 may be retained.

Figure 5:
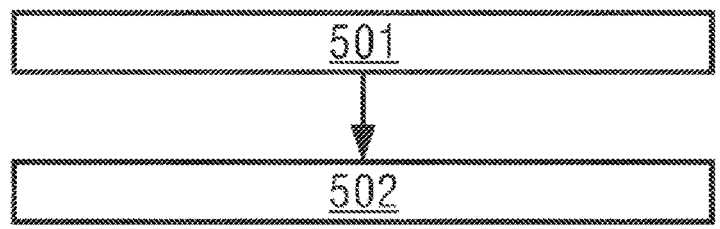
FIG. 5 is a flow chart of a method for sending a preprocessing algorithm provided by an embodiment of the present invention.

Optionally, on the basis of the field data transmission method shown in FIG. 3, after step 302, in which a corresponding control message is generated for each first apparatus operation indicator, a preprocessing algorithm may be sent to the corresponding master edge controller for each first apparatus operation indicator, so that the master edge controller preprocesses field data according to the required preprocessing algorithm. As shown in FIG. 5, the method for sending a preprocessing algorithm to a master edge controller may comprise the following steps:

Step 501: For each first apparatus operation indicator, determine a preprocessing algorithm corresponding to the first apparatus operation indicator, wherein the preprocessing algorithm is used for a first master edge controller to preprocess second field data into first field data, and the first master edge controller is used for sending to the cloud platform the first field data required for data analysis of the first apparatus operation indicator;

Step 502: Send the preprocessing algorithm to the first master edge controller.

In an embodiment of the present invention, for each first apparatus operation indicator, after the control message corresponding to the first apparatus operation indicator is sent to each edge controller, the preprocessing algorithm corresponding to the first apparatus operation indicator may also be determined, and the determined preprocessing algorithm may be sent to the first master edge controller corresponding to the first apparatus operation indicator, and the first master edge controller can preprocess the field data according to the received preprocessing algorithm, and then obtain the first field data required for analyzing the first apparatus operation indicator. By sending a preprocessing algorithm to a master edge controller, the master edge controller may be caused to process the field data according to the sent preprocessing algorithm, so as to obtain the field data for analyzing apparatus operation indicators, and so different preprocessing algorithms may be sent to the master edge controller according to requirements for analyzing the field data, thereby obtaining the first field data for analyzing different apparatus operation indicators, which allows users to obtain different apparatus operation indicators as needed, so as to meet individual needs of different users and improve the applicability of field data analysis.

Figure 6:
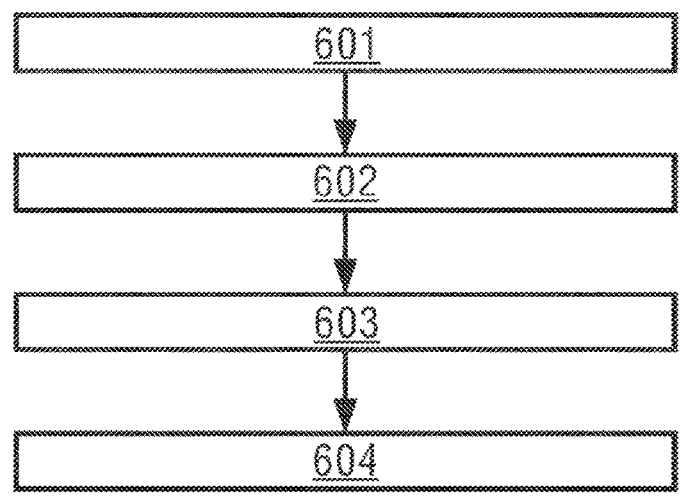
FIG. 6 is a flow chart of a method for updating a preprocessing algorithm provided by an embodiment of the present invention.

Optionally, on the basis of the field data transmission method shown in FIG. 3, after receiving first field data from a master edge controller in step 304, whether the preprocessing algorithm running on master edge controller needs to be updated may be determined by analyzing the first field data, and then the preprocessing algorithm running on the master edge controller is updated when the need arises. As shown in FIG. 6, the method for updating a preprocessing algorithm on a master edge controller may comprise the following steps:

Step 601: For each master edge controller, perform data analysis on the first field data from the master edge controller to obtain a numerical value of the corresponding first apparatus operation indicator;

Step 602: Judge whether the obtained numerical value of the first apparatus operation indicator is abnormal;

Step 603: If the numerical value of the first apparatus operation indicator is abnormal, then determine an algorithm update instruction according to the numerical value of the first apparatus operation indicator, wherein the algorithm update instruction is used to instruct the master edge controller to, according to a target preprocessing algorithm, preprocess the second field data obtained later;

Step 604: Send the algorithm update instruction to the master edge controller.

In an embodiment of the present invention, after receiving first field data sent by a master edge controller, data analysis is performed on the first field data to obtain a numerical value of the corresponding first apparatus operation indicator, wherein, when the obtained numerical value of the first apparatus operation indicator is abnormal, it indicates that the corresponding field apparatus may be operating abnormally, and that the previous preprocessing algorithm is no longer applicable, in which case the corresponding algorithm update instruction may be sent to the master edge controller to update the preprocessing algorithm running on the master edge controller for calculating the first field data, thereby further analyzing and detecting the operating state of the corresponding field apparatus.

In an embodiment of the present invention, by sending an algorithm update instruction to a master edge controller, the preprocessing algorithm running on the master edge controller may be updated in real time, so as to change the preprocessing algorithm used by the master edge controller to preprocess field data, so that the strategy for data analysis of field data is conveniently changed, thereby providing greater flexibility in data analysis of the field data.

Figure 7:
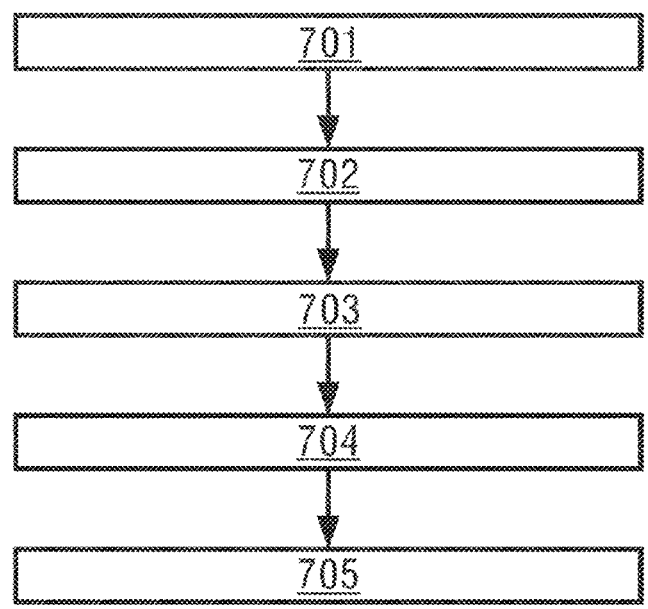
FIG. 7 is a flow chart of a load balancing method for an edge controller provided by an embodiment of the present invention.

Optionally, on the basis of the field data transmission method shown in FIG. 1, after receiving first field data from each master edge controller in step 304, whether the load each master edge controller is balanced may be determined by analyzing the first field data, and, when the load is unbalanced, the load may be balanced by sending a load transfer instruction. As shown in FIG. 7, the method for balancing the load of each edge controller may comprise the following steps:

Step 701: For each master edge controller, determine the load of the master edge controller according to the data amount of the first field data from the master edge controller, the number and load degrees of the preprocessing algorithms running on the master edge controller, wherein at least one preprocessing algorithm runs on the master edge controller, and different preprocessing algorithms are used to process different second field data into corresponding first field data;

Step 702: Determine, from each master edge controller, a second master edge controller with the largest load;

Step 703: Determine whether the load of the second master edge controller is higher than a preset first load threshold;

Step 704: If the load of the second master edge controller is higher than the first load threshold, generate a load transfer instruction, wherein the load transfer instruction is used to transfer at least one preprocessing algorithm running on the second master edge controller to a second edge controller for running, and instruct the second edge controller to send, to the cloud platform, the first field data obtained by using the transferred preprocessing algorithm, wherein the load of the second edge controller is lower than a preset second load threshold, and the second load threshold is lower than the second load threshold;

Step 705: Send the load transfer instruction to the second master edge controller and the second edge controller.

In an embodiment of the present invention, after the first field data sent by each master edge controller are received, the load of each master edge controller may be determined according to the data amount of the first field data, the relationship between different data in the first field data, and the number and complexity of the preprocessing algorithms running on each master edge controller, and when the load of the master edge controller with the largest load is higher than a preset first load threshold, one or more preprocessing algorithms running on the master edge controller may be transferred to another edge controller for running, thereby reducing the load of the master edge controller to realize load balancing between different edge controllers, which ensures that each edge controller can properly collect data, transmit data and preprocess data to ensure that field data may be sent to the cloud platform smoothly.

In an embodiment of the present invention, since an edge controller collects field data according to a set data collection cycle and sends preprocessed field data, every time the cloud platform receives the first field data sent by each master edge controller, load balancing may be performed once, so that preprocessing algorithms running on a master edge controller that have a heavy load may be continuously transferred to other edge controllers with lighter loads, so as to realize dynamic adjustment of load balancing between different edge controllers.

Figure 8:
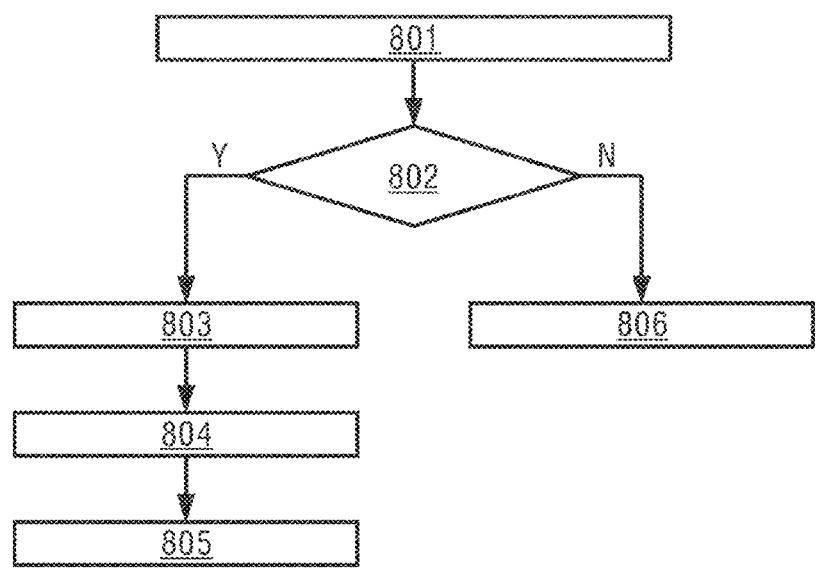
FIG. 8 is a flow chart of another field data transmission method provided by an embodiment of the present invention.

In a field data transmission method provided by an embodiment of the present invention, an edge controller can collect field data according to a control message from the cloud platform, and can send collected field data to a master edge controller, or aggregate field data collected by other edge controllers and, after preprocessing the received field data, send them to the cloud platform, so as to eliminate the need for the cloud platform to search and filter the field data after each edge controller sends the field data to the cloud platform, respectively. As shown in FIG. 8, the field data transmission method performed by an edge controller may comprise the following steps:

Step 801: Receive a control message from a cloud platform;

Step 802: Judge whether the current edge controller is a master edge controller according to the control message, wherein, if it is yes (Y), go to step 803, and if it is not (N), go to step 806;

Step 803: Obtain second field data according to the control message, wherein the second field data are used to represent an operating state of at least one field apparatus, include field data collected by at least one edge controller, and include field data collected by the current edge controller;

Step 804: Preprocess the second field data to obtain first field data, wherein the first field data are used for the cloud platform to perform data analysis to obtain the first apparatus operation indicator corresponding to the control message;

Step 805: Send the first field data to the cloud platform, and end the current flow;

Step 806: Collect field data according to the control message, and send the collected field data to the master edge controller indicated by the main control message.

In an embodiment of the present invention, after receiving a control message, an edge controller can determine whether it is a master edge controller according to the control message, wherein, if it is determined that it is a master edge controller, then the edge controller can collect field data according to the control message, receive, according to the control message, field data sent by other edge controllers, then preprocess the collected field data and the received field data to obtain first field data, and then send the obtained first field data to the cloud platform, and if it is determined that it is not a master edge controller, then the edge controller can collect field data according to the control message, and send collected field data to the master edge controller indicated by the control message. It is thus clear that each edge controller can collect the corresponding field data according to a control message, and aggregate the collected field data to a master edge controller, which preprocesses the collected field data and sends them to the cloud platform, so that the received field data may also be used directly for data analysis, without the need to find the required field data in the field data sent by all the edge controllers separately, which saves the computing resources required by the cloud platform for data search, thereby allowing a reduction in the cost of field data analysis with the cloud platform.

In an embodiment of the present invention, since a cloud platform can send a control message to each edge controller in the form of a broadcast message, after an edge controller receives a control message, the edge controller may adopt one of the following three handling modes depending on the content of the control message, wherein, in the first handling mode, the control message indicates that the edge controller is a master edge controller, in which case the edge controller completes the processing by a master edge controller according to the control message, in the second handling mode, the control message indicates that the edge controller is a slave edge controller, in which case the edge controller collects field data according to the control message, and sends the collected field data to the master edge controller designated by the control message, and in the third handling mode, the content of the control message does not involve the edge controller, which means that the edge controller is neither a master edge controller nor a slave edge controller for the control message, and that, in this case, the edge controller ignores the control message.

Optionally, on the basis of the field data transmission method shown in FIG. 8, in step 804, before the second field data are preprocessed to obtain the first field data, a preprocessing algorithm may also be received from the cloud platform, and then in step 804, the second field data may be processed using the received preprocessing algorithm to obtain the first field data.

In an embodiment of the present invention, after an edge controller determines that it is a master edge controller according to a received control message, the edge controller may also receive a preprocessing algorithm from the cloud platform, and then, after obtaining second field data according to the control message, the edge controller can preprocess the received second field data by using the received preprocessing algorithm, and then send the first field data obtained by the preprocessing to the cloud platform. The edge controller can preprocess field data according to a preprocessing algorithm sent by the cloud platform, so as to meet different data preprocessing needs of the cloud platform and facilitate various types of data analysis by the cloud platform.

Optionally, on the basis of the field data transmission method shown in FIG. 8, after first field data are sent to the cloud platform in step 805, an algorithm update instruction from the cloud platform may also be received, the preprocessing algorithm previously used for preprocessing the corresponding second field data may, according to the algorithm update instruction, be replaced with a target preprocessing algorithm, and then the target preprocessing algorithm may be used to preprocess the second field data obtained again.

In an embodiment of the present invention, an edge controller functioning as a master edge controller can receive an algorithm update instruction from a cloud platform, and then the edge controller can replace the corresponding preprocessing algorithm running thereon with a target preprocessing algorithm according to the algorithm update instruction, and then subsequently use the target preprocessing algorithm, in place of the replaced preprocessing algorithm, to preprocess the second field data. The edge controller can, according to the algorithm update instruction from the cloud platform, change the preprocessing algorithm it uses to preprocess field data, so as to meet the needs of users to change a preprocessing algorithm.

Figure 9:
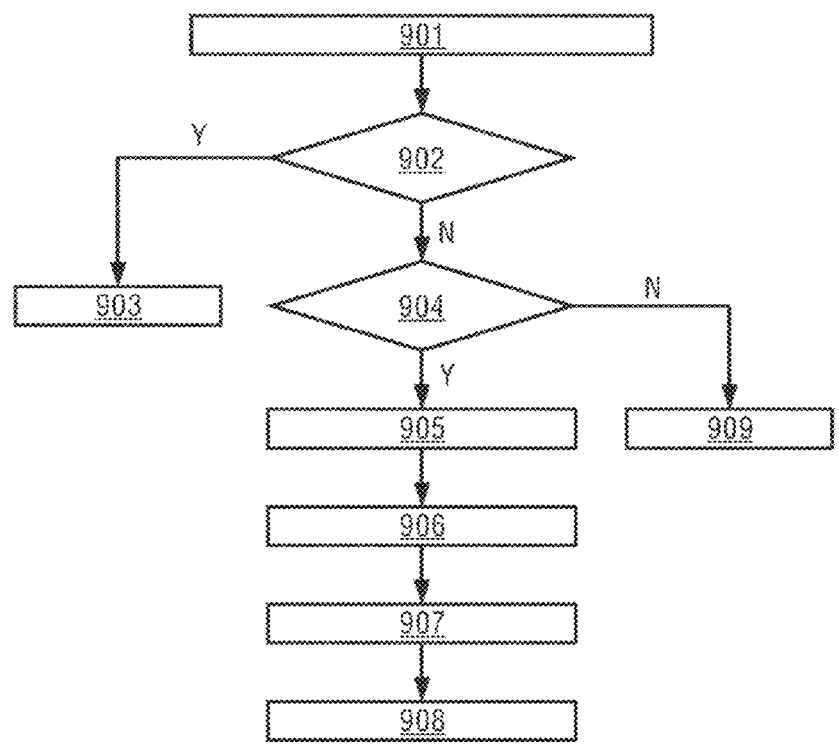
FIG. 9 is a flow chart of a load transfer method provided by an embodiment of the present invention.

Optionally, on the basis of the field data transmission method shown in FIG. 8, after first field data are sent to the cloud platform in step 805, the edge controller may receive a load transfer instruction from the cloud platform, thereby realizing load transfer. As shown in FIG. 9, the method for transferring a load by an edge controller may comprise the following steps:

Step 901: Receive a load transfer instruction from the cloud platform;

Step 902: Identify whether the current edge controller is the first master edge controller indicated by the load transfer instruction, wherein, if it is yes (Y), go to step 903, and, if it is not (N), go to step 904;

Step 903: Transfer at least one preprocessing algorithm running on the current edge controller to a second edge controller, so that the second edge controller obtains first field data by using each transferred preprocessing algorithm, and sends the obtained first field data to the cloud platform, wherein the load of the second edge controller is lower than a preset second load threshold, and the current flow ends;

Step 904: Identify whether the current edge controller is the second edge controller indicated by the load transfer instruction, wherein, if it is Y, go to step 905 and, if it is not, go to step 909;

Step 905: Obtain at least one preprocessing algorithm that, as indicated by the load transfer instruction, needs to be transferred;

Step 906: For each transferred preprocessing algorithm, obtain second field data that need to be preprocessed by the preprocessing algorithm;

Step 907: Preprocess the corresponding second field data by using the transferred preprocessing algorithm to obtain first field data;

Step 908: Send the obtained first field data to the cloud platform, and end the current flow;

Step 909: End the current flow.

In an embodiment of the present invention, an edge controller may receive a load transfer instruction from a cloud platform, wherein if the load transfer instruction indicates that the edge controller needs to transfer one or more preprocessing algorithms, then one or more preprocessing algorithms running on the edge controller are transferred to an edge controller with a lighter load according to the load transfer instruction, and the edge controller with a lighter load undertakes part of the tasks of data collection, reception, preprocessing and transmission, and, if the load transfer instruction indicates that the edge controller needs to receive one or more preprocessing algorithms, then the edge controller obtains second field data, preprocesses the obtained second field data through the transferred preprocessing algorithm, and sends the first field data obtained by preprocessing to the cloud platform.

In an embodiment of the present invention, an edge controller with a heavy load may transfer part of the preprocessing algorithms running thereon to an edge controller with a lighter load according to a load transfer instruction from the cloud platform, and the edge controller with a lighter load, by using the transferred preprocessing algorithm, preprocesses the field data, and sends the preprocessed field data to the cloud platform, thereby achieving a load balance between different edge controllers and ensuring that each edge controller operates properly.

Figure 10:
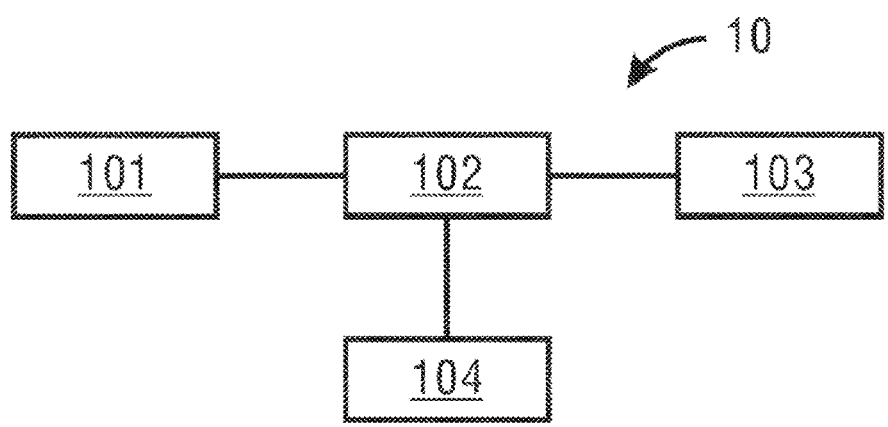
FIG. 10 is a schematic diagram of a cloud platform provided by an embodiment of the present invention.

As shown in FIG. 10, an embodiment of the present invention provides a cloud platform 10, comprising:

an indicator determination module 101 configured to determine at least one first apparatus operation indicator that needs to be obtained by data analysis;

a message generation module 102 configured to, for each first apparatus operation indicator determined by the indicator determination module 101, generate a control message for the first apparatus operation indicator, wherein the control message is used to determine the master edge controller from at least one edge controller, the master edge controller is used to send the first field data to the cloud platform, the first field data are used for the cloud platform to perform analysis to obtain the first apparatus operation indicator, the first field data are obtained by preprocessing the second field data by the master edge controller, the second field data are collected by at least one edge controller, and the second field data are used for characterizing operating states of at least one field apparatus;

a message sending module 103 configured to send each control message generated by the message generation module 102 to each edge controller respectively;

a data receiving module 104 configured to receive first field data from each master edge controller respectively, wherein each master edge controller is determined by each control message generated by the message generation module 102.

In an embodiment of the present invention, the indicator determination module 101 may be configured to perform step 301 in the above-described method embodiments, the message generation module 102 may be configured to perform step 302 in the above-described method embodiments, the message sending module 103 may be configured to perform step 303 in the above-described method embodiments, and the data receiving module 104 may be configured to perform step 304 in the above-described method embodiments.

Figure 11:
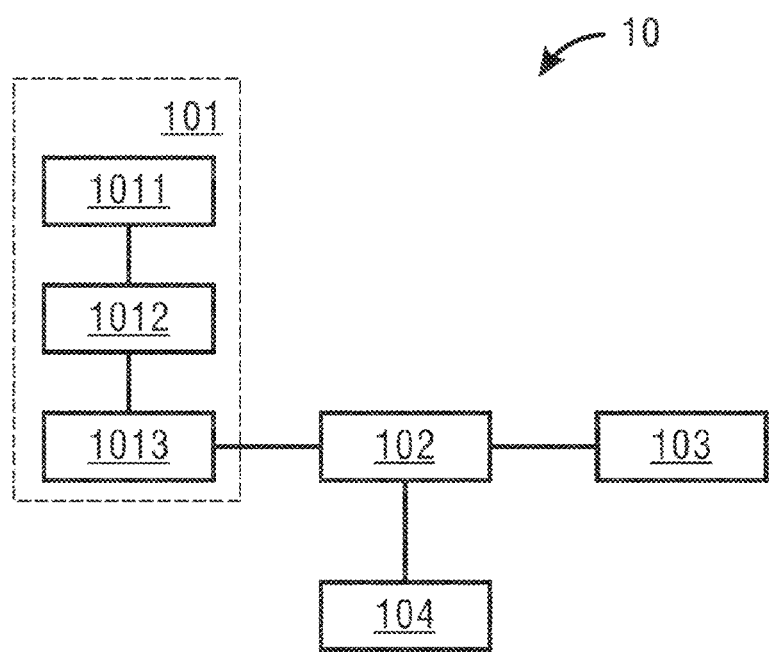
FIG. 11 is a schematic diagram of another cloud platform provided by an embodiment of the present invention.

Optionally, on the basis of the cloud platform 10 shown in FIG. 10, as shown in FIG. 11, the indicator determination module 101 comprises:

a data analysis unit 1011 configured to perform data analysis on third field data from at least one edge controller, and obtain the numerical value of at least one second apparatus operation indicator, wherein the time when the cloud platform 10 receives the third field data is earlier than the time when the first field data are received;

a numerical value judgment unit 1012 configured to respectively judge whether the numerical value of each second apparatus operation indicator obtained by the data analysis unit 1011 is within a corresponding normal value range;

an indicator screening unit 1013 configured to determine at least one first apparatus operation indicator according to the numerical value of each second apparatus operation indicator when the numerical value determination unit 1012 determines that the numerical value of at least one second apparatus operation indicator is outside the corresponding normal value range, wherein the first apparatus operation indicator is different from the second apparatus operation indicator.

In an embodiment of the present invention, the data analysis unit 1011 may be configured to perform step 401 in the above-described method embodiments, the numerical value determination unit 1012 may be configured to perform step 402 in the above-described method embodiments, and the indicator screening unit 1013 may be configured to perform step 403 in the above-described method embodiments.

Figure 12:
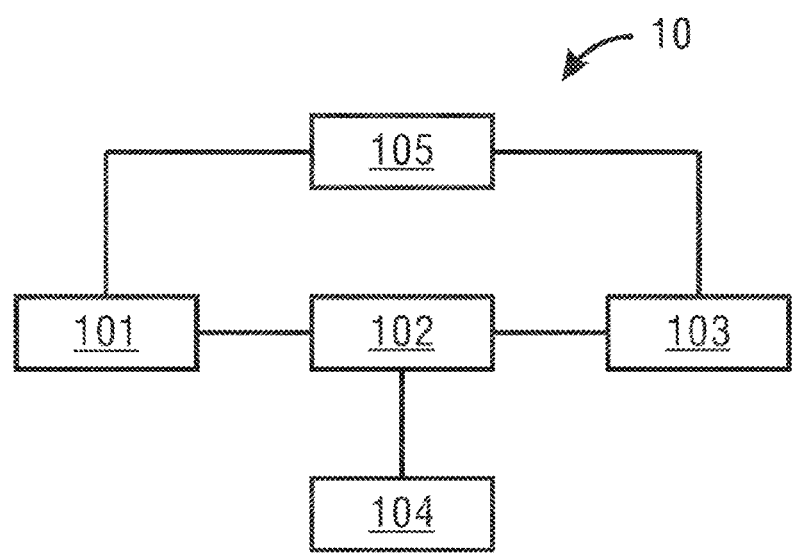
FIG. 12 is a schematic diagram of a cloud platform comprising an algorithm determination module according to an embodiment of the present invention.

Optionally, on the basis of the cloud platform 10 shown in FIG. 10, as shown in FIG. 12, the cloud platform 10 further comprises: an algorithm determination module 105;

the algorithm determination module 105 is configured to determine, for each first apparatus operation indicator determined by the indicator determination module 101, a preprocessing algorithm corresponding to the first apparatus operation indicator, wherein the preprocessing algorithm is used for a first master edge controller to preprocess second field data into first field data, and the first master edge controller is used for sending to the cloud platform the first field data required for data analysis of the first apparatus operation indicator;

a message sending module 103 further configured to send the preprocessing algorithm determined by the algorithm determining module 105 to a first master edge controller.

In an embodiment of the present invention, the algorithm determining module 105 may be configured to perform step 501 in the above-described method embodiments, and the message sending module 103 may be configured to perform step 502 in the above-described method embodiments.

Figure 13:
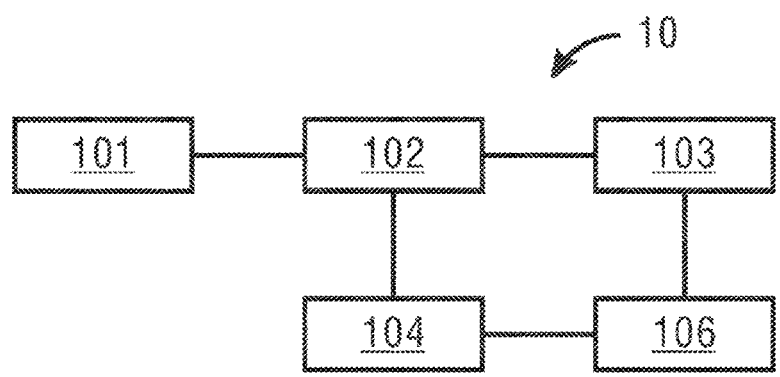
FIG. 13 is a schematic diagram of a cloud platform comprising an algorithm update module provided by an embodiment of the present invention.

Optionally, on the basis of the cloud platform 10 shown in FIG. 10, as shown in FIG. 13, the cloud platform 10 further comprises: an algorithm update module 106;

the algorithm update module 106 is configured to, for each master edge controller, perform data analysis on the first field data received by the data receiving module 104 from the master edge controller, obtain the numerical value of the corresponding first equipment operating indicator, judge whether the numerical value of the first apparatus operation indicator is abnormal, and, if the numerical value of the first apparatus operation indicator is abnormal, determine an algorithm update instruction according to the numerical value of the first apparatus operation indicator, wherein the algorithm update instruction is used to instruct the master edge controller to, according to a target preprocessing algorithm, preprocess the second field data obtained later;

a message sending module 103 further configured to send an algorithm update instruction generated by the algorithm update module 106 to the corresponding master edge controller.

In an embodiment of the present invention, the algorithm update module 106 may be configured to perform steps 601 to 603 in the above-described method embodiments, and the message sending module 103 may be configured to perform step 604 in the above-described method embodiments.

Figure 14:
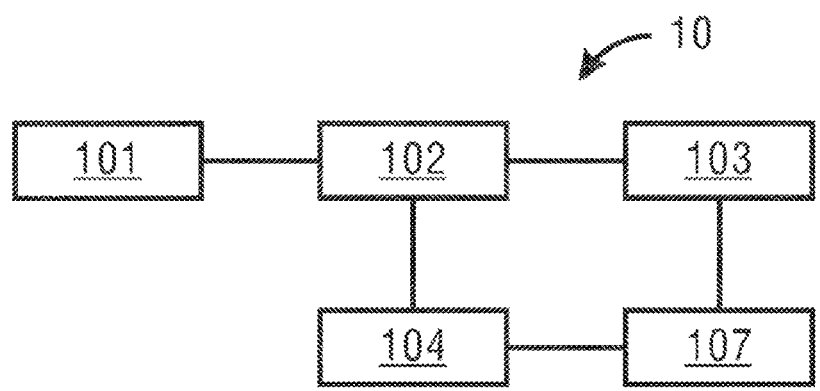
FIG. 14 is a schematic diagram of a cloud platform comprising a load balancing module according to an embodiment of the present invention.

Optionally, on the basis of the cloud platform 10 shown in any of FIG. 10 to FIG. 13, as shown in FIG. 14, the cloud platform 10 further comprises: a load balancing module 107;

the load balancing module 107 is configured to, for each master edge controller, according to the data amount and the relationship between the data of the first field data received by the data receiving module 104 from the master edge controller, and the number and complexity of preprocessing algorithms running on the master edge controller, determine the load of the master edge controller, wherein at least one of the preprocessing algorithms is run on the master edge controller, and the different preprocessing algorithms are used for processing the different second field data into the corresponding first field data, determining, from each of the master edge controllers, a second master edge controller with the largest load, judging whether the load of the second master edge controller is higher than a preset first load threshold, and, if the load of the second master edge controller is higher than the first load threshold, then generating a load transfer instruction, wherein the load transfer instruction is used to transfer at least one preprocessing algorithm running on the second master edge controller to a second edge controller for running, and instruct the second edge controller to send, to the cloud platform, the first field data obtained by using the transferred preprocessing algorithm, wherein the load of the second edge controller is lower than a preset second load threshold, and the second load threshold is lower than the second load threshold;

the message sending module 103 is further configured to send a load transfer instruction generated by the load balancing module 107 to the second master edge controller and the second edge controller.

In an embodiment of the present invention, the load balancing module 107 may be configured to perform steps 701 to 704 in the above-described method embodiments, and the message sending module 103 may be configured to perform step 702 in the above-described method embodiments.

Figure 15:
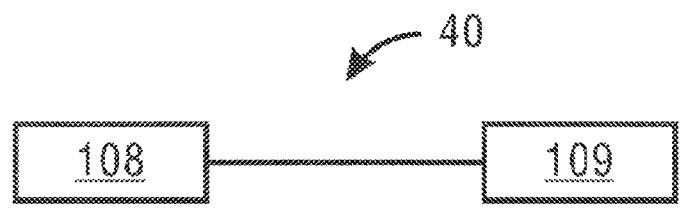
FIG. 15 is a schematic diagram of yet another cloud platform provided by an embodiment of the present invention.

As shown in FIG. 15, an embodiment of the present invention provides a cloud platform 40, comprising: at least one memory 108 and at least one processor 109;

the at least one memory 108 is configured to store a machine-readable program;

the at least one processor 109 is configured to invoke the machine-readable program to execute the field data transmission method performed by a cloud platform as provided in the above-described embodiments.

Figure 16:
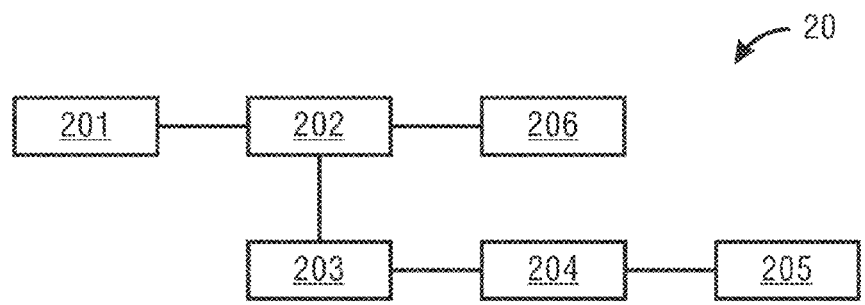
FIG. 16 is a schematic diagram of an edge controller provided by an embodiment of the present invention.

As shown in FIG. 16, an embodiment of the present invention provides an edge controller 20, comprising:

a message receiving module 201 configured to receive a control message from a cloud platform;

a controller identification module 202 configured to determine whether an edge controller is a master edge controller according to a control message received by the message receiving module 201;

a data acquisition module 203 configured to obtain second field data according to a control message when the controller identification module 202 determines that an edge controller is a master edge controller, wherein the second field data are used to characterize the operating state of at least one field apparatus, the second field data include field data collected by at least one edge controller, and the second field data include field data collected by the master edge controller;

a data preprocessing module 204 configured to preprocess second field data obtained by the data acquisition module 203, so as to obtain first field data, wherein the first field data are used for the cloud platform to perform data analysis to obtain the first apparatus operation indicator corresponding to the control message;

a data sending module 205 configured to send first field data obtained by the data preprocessing module 204 to a cloud platform;

a data collection module 206 configured to collect field data according to a control message when the controller identification module 202 determines that the edge controller is not a master edge controller and, through the data sending module, send collected field data to the master edge controller indicated by the control message.

In an embodiment of the present invention, the message receiving module 201 may be configured to perform step 801 in the above-described method embodiments, the controller identification module 202 may be configured to perform step 802 in the above-described method embodiments, the data acquisition module 203 may be configured to perform step 803 in the above-described method embodiments, the data preprocessing module 204 may be configured to perform step 804 in the above-described method embodiments, the data sending module 205 may be configured to perform step 805 in the above-described method embodiments, and the data collection module 206 may be configured to perform step 806 in the above-described method embodiments.

Optionally, on the basis of the edge controller 20 shown in FIG. 16, the message receiving module 201 is further configured to receive a preprocessing algorithm from a cloud platform, wherein the preprocessing algorithm corresponds to a first apparatus operation indicator;

the data preprocessing module 204 is configured to preprocess second field data obtained by the data acquisition module by using a preprocessing algorithm received by the message receiving module 201, so as to obtain first field data.

Optionally, on the basis of the edge controller 20 shown in FIG. 16, the message receiving module 201 is further configured to receive an algorithm update instruction from a cloud platform;

the data preprocessing module 204 is further configured to, according to an algorithm update instruction received by the message receiving module, replace the previously used preprocessing algorithm with a target preprocessing algorithm, so as to preprocess the re-obtained second field data by using the target preprocessing algorithm.

Figure 17:
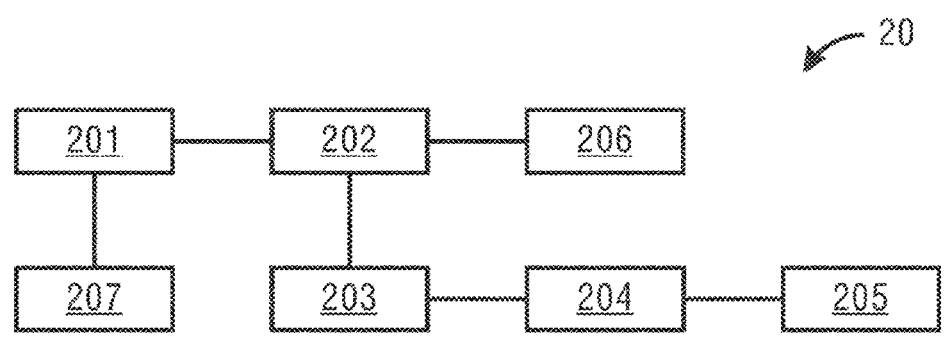
FIG. 17 is a schematic diagram of another edge controller provided by an embodiment of the present invention.

Optionally, on the basis of the edge controller 20 shown in FIG. 16, as shown in FIG. 17, the edge controller 20 further comprises: a load transfer module 207;

a message receiving module 201 further configured to receive a load transfer instruction from a cloud platform;

a load transfer module 207 configured to identify whether the edge controller is a second master edge controller or second edge controller indicated by the load transfer instruction received by the message receiving module 201, and, if the edge controller is the second master edge controller indicated by the load transfer instruction, then transfer at least one preprocessing algorithm running on the edge controller to a second edge controller, so that the second edge controller obtains first field data by using each of the transferred preprocessing algorithms, respectively, and sends the obtained first field data to the cloud platform, wherein the load of the second edge controller is lower than a preset second load threshold, if the edge controller is the second edge controller indicated by the load transfer instruction, then obtain at least one preprocessing algorithm that needs to be transferred as indicated by the load transfer instruction, and, for each of the preprocessing algorithms transferred, make the data acquisition module 203 obtain the second field data that need to be preprocessed by the preprocessing algorithm, make the data preprocessing module 204 preprocess the obtained second field data by using the preprocessing algorithm to obtain first field data, and make the data sending module 205 send the obtained first field data to the cloud platform.

In an embodiment of the present invention, the message receiving module 201 may be configured to perform step 901 in the above-described method embodiments, and the load transfer module 207 may be configured to perform steps 902 to 909 in the above-described method embodiments.

Figure 18:
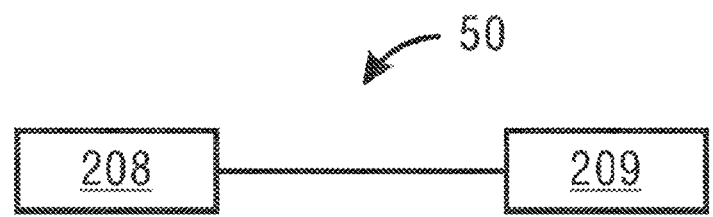
FIG. 18 is a schematic diagram of yet another edge controller provided by an embodiment of the present invention.

As shown in FIG. 18, an embodiment of the present invention provides an edge controller 50, comprising: at least one memory 208 and at least one processor 209;

the at least one memory 208 is configured to store a machine-readable program;

the at least one processor 209 is configured to invoke the machine-readable program to execute the field data transmission method performed by an edge controller as provided in each of the above-described embodiments.

Figure 19:
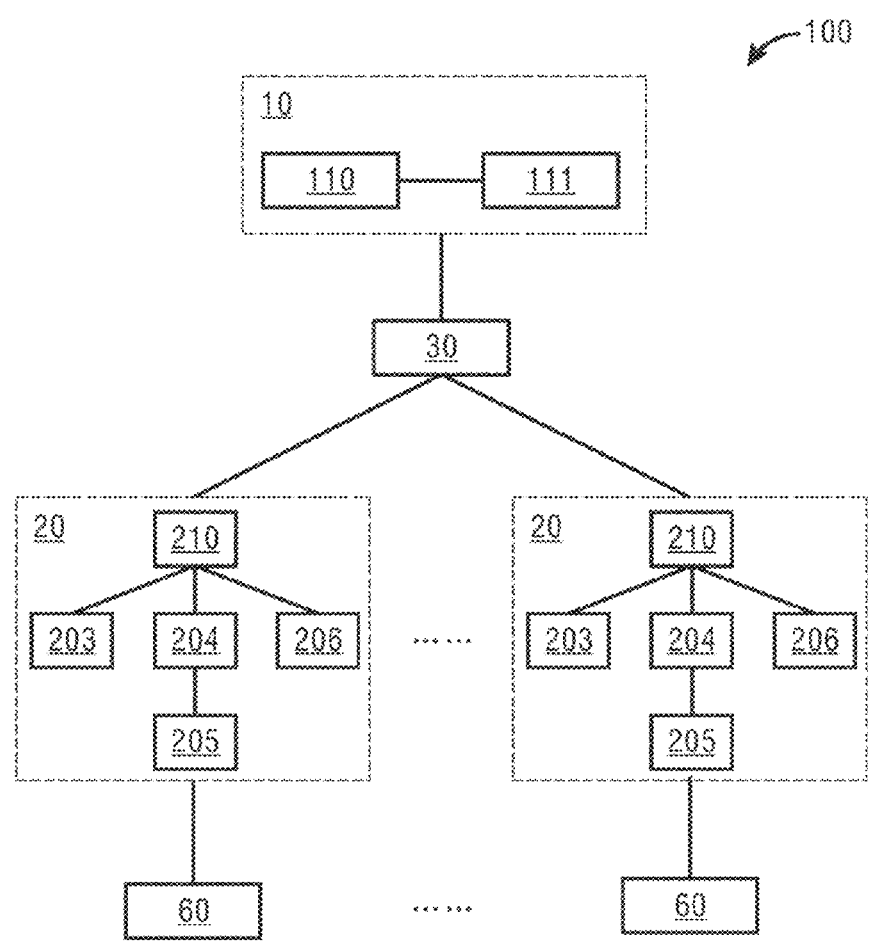
FIG. 19 is a schematic diagram of yet another field data transmission system provided by an embodiment of the present invention.

The field data transmission system 100 provided by an embodiment of the present invention will be further described below by taking the example of sending field data of a plurality of production lines in a factory to a cloud platform, in conjunction with the cloud platform and edge controllers provided by each of the above-described embodiments. As shown in FIG. 19, the field data transmission system 100 comprises a cloud platform 10, a gateway 30 and a plurality of edge controllers 20, each edge controller 20 being responsible for collecting field data of a production line 60;

for each edge controller 20, if the edge controller 20 is a master edge controller, then the data collection module 206 in the edge controller 20 can, according to the configuration of a data control service module 210, collect field data from the production line 60 for which it is responsible; the data acquisition module 203 in the edge controller 20 can receive field data sent by another edge controller 20 according to the configuration of the data control service module 210, and determine the received field data and the field data collected by the data collection module 206 as second field data; the data preprocessing module 204 in the edge controller 20 may preprocess the second field data determined for the data acquisition module 203 according to the configuration of the data control service module 210, so as to obtain first field data; the data sending module 205 in the edge controller 20 can send the first field data obtained by the data preprocessing module 204 to the cloud platform 10 through the gateway 30.

For each edge controller 20, if the edge controller 20 is not a master edge controller, then the data collection module 206 in the edge controller 20 can, according to the configuration of the data control service module 210, collect field data from the production line 60 for which it is responsible, and, meanwhile, the data collection module 206 in the edge controller 20 can also send the collected field data to a corresponding master edge controller according to the configuration of the data control service module 210.

The data analysis module 110 in the cloud platform 10 can perform data analysis on the first field data sent by a master edge controller to obtain a corresponding apparatus operation indicator; the edge management module 111 in the cloud platform 10 can, according to apparatus operation indicators obtained by the data analysis module, analyze whether it is necessary to regroup the edge controllers 20, whether it is necessary to update a preprocessing algorithm running on a master edge controller, and whether it is necessary to perform load balancing processing on the edge controllers 20, and then the edge management module 111 can, according to analysis results, generate a corresponding control message, algorithm update instruction and load transfer instruction, and send the generated control message, algorithm update instruction and load transfer instruction to the corresponding edge controller 20 through the gateway 30. The data control service module 210 in the edge controller 20 can configure the data collection module 206, the data acquisition module 203, the data preprocessing module 204 and the data sending module 205 according to a control message, algorithm update instruction, and load transfer instruction from the cloud platform 10.

In an embodiment of the present invention, the data control service module 210 may implement some or all of the functions of the message receiving module 201, the controller identification module 202, and the load transfer module 207 in the above-described embodiments, the data analysis module 110 may implement some or all of the functions of the indicator determination module 101 and the data receiving module 104 in the above-described embodiments, and the edge management module 111 can implement some or all of the functions of the indicator determination module 101, the message generation module 102, the message sending module 103, the algorithm determination module 105, the algorithm update module 106 and the load balancing module 107 in the above-described embodiments.

It should be noted that while, in the above-mentioned embodiment, the process of interaction between the modules in an edge controller 20 has been described according to whether the edge controller 20 is a master edge controller, in the actual service implementation process, the same edge controller 20 may, at the same time, be a master edge controller and a slave edge controller that sends field data to a master edge controller, or the same edge controller 20 may, at the same time, be a plurality of master edge controllers corresponding to different apparatus operation indicators, or the same edge controller 20 may, at the same time, be a plurality of slave edge controllers corresponding to different apparatus operation indicators. The same edge controller 20 can operate separately according to different control messages, and the operating processes according to different control messages do not affect each other.

Embodiments of the present invention further provide a computer-readable medium storing an instruction for causing a computer to execute a field data transmission method as described herein. Specifically, a system or device equipped with a storage medium may be provided, the storage medium storing software program code for implementing the functions of any one of the above-described embodiments, and a computer (for example, a CPU or an MPU) of the system or device is caused to read and execute the program code stored in the storage medium.

In this case, the program code itself read from the storage medium can fulfill the functions of any one of the above-described embodiments and, therefore, program code and the storage medium storing the program code constitute a part of the present invention.

Examples of a storage medium for providing program code include floppy disk, hard disk, magneto-optical disk, optical disk (for example, CD-ROM, CD-R, CD-RW, DVD- ROM, DVD-RAM, DVD-RW, or DVD+RW), magnetic tape, non-volatile memory card, and ROM. Optionally, program code may be downloaded from a server computer via a communications network.

In addition, it should be made clear that functions of any one of the above-described embodiments may be implemented not only by executing program code read by a computer but also by causing, according to an instruction given by program code, an operating system, etc. running on a computer to complete part or all of actual operations.

In addition, it is understandable that functions of any one of the above-described embodiments may be implemented by writing program code read from a storage medium to a memory disposed in an expansion board inserted into a computer or to a memory disposed in an expansion unit connected to a computer, and then by, according to the instruction of program code, causing a CPU, etc. installed on the expansion board or expansion unit to execute part or all of actual operations.

It should be noted that not all the steps or modules in the above-described flows and system structural diagrams are required, and certain steps or modules may be omitted as needed. The sequence of performing steps is not fixed and may be adjusted as needed. The system structures described in the above embodiments may be physical structures or logical structures, which means that certain modules may be implemented as the same physical entity, or certain modules may be implemented as a plurality of physical entities separately, or certain modules may be jointly implemented by certain components in a plurality of standalone devices.

In each of the above embodiments, a hardware unit may be implemented mechanically or electrically. For example, a hardware unit may comprise a permanently dedicated circuit or logic, for example, a special processor, an FPGA, or an ASIC, for completing corresponding operations. A hardware unit may further comprise programmable logic or circuitry (for example, a general-purpose processor or any other programmable processor), which may be temporarily configured by software to perform corresponding operations. Specific implementations (mechanical, or dedicated permanent circuits, or temporarily configured circuits) may be determined on the basis of cost and time considerations.

While the present invention has been described and illustrated in detail above with reference to the drawings and embodiments, the present invention is not limited to these disclosed embodiments, and those of ordinary skill in the art, on the basis of the above-mentioned embodiments, may appreciate that more embodiments of the present invention may be obtained by combining the code auditing device or apparatus in the different embodiments described above and that these embodiments also fall within the protection scope of the present invention.

The invention claimed is:

1. A field data transmission method, comprising:
   determining, by a cloud platform, a first apparatus operation indicator to be obtained by a first data analysis;
   generating, by the cloud platform, a control message for the first apparatus operation indicator, the control message being used to determine a first master edge controller from among a plurality of edge controllers, the first master edge controller being used to send first field data to the cloud platform, the first field data being used for the cloud platform to perform the first data analysis, the first field data being obtained by preprocessing second field data by the first master edge controller, the second field data being collected by a first edge controllers among the plurality of edge controllers, and the second field data being used for characterizing operating states of at least one field apparatus;
   sending, by the cloud platform, the control message to each of the plurality of edge controllers; and
   receiving, by the cloud platform, the first field data from the first master edge controller corresponding to the control message.

2. The method as claimed in claim 1, wherein the determining of the first apparatus operation indicator comprises:
   performing a second data analysis on third field data from the plurality of edge controllers to obtain a numerical value of a second apparatus operation indicator, the third field data being received by the cloud platform before the first field data;
   judging whether the numerical value of the second apparatus operation indicator is within a normal value range; and
   determining the first apparatus operation indicator according to the numerical value of the second apparatus operation indicator based on the numerical value of the second apparatus operation indicator being outside of the normal value range, the first apparatus operation indicators being different from the second apparatus operation indicators.

3. The method as claimed in claim 2, wherein
   the plurality of edge controllers includes a plurality of master edge controllers, the plurality of master edge controllers including the first master edge controller, and each respective master edge controller among the plurality of master edge controllers being used to send corresponding first field data to the cloud platform; and
   the method further comprises:
      determining a load of each respective master edge controller among the plurality of master edge controllers according to
         a data amount of the corresponding first field data from the respective master edge controller,
         a relationship between data among the corresponding first field data from the respective master edge controller, and
         a number and complexity of preprocessing algorithms run by the respective master edge controller, at least one of the preprocessing algorithms being run on the respective master edge controller, and respective processing algorithms among the preprocessing algorithms being used for processing different second field data into corresponding first field data,
      determining a second master edge controller with a largest load among the plurality of master edge controllers,
      judging whether the load of the second master edge controller is higher than a first load threshold,
      generating a load transfer instruction based on the load of the second master edge controller being higher than the first load threshold, the load transfer instruction being used to
         transfer at least one preprocessing algorithm running on the second master edge controller to a second edge controller among the plurality of edge controllers, and
         instruct the second edge controller to send corresponding first field data to be obtained by using the transferred preprocessing algorithm to the cloud platform, a load of the second edge controller being lower than a second load threshold, and the second load threshold being lower than the first load threshold, and sending the load transfer instruction to the second master edge controller and the second edge controller.

4. The method as claimed in claim 1, further comprising:

determining, with the cloud platform, a preprocessing algorithm corresponding to the first apparatus operation indicator after the generating the control message, the preprocessing algorithm being used for the first master edge controller to preprocess the second field data into the first field data, and the first master edge controller being used for sending to the cloud platform the first field data required for the first data analysis of the first apparatus operation indicator; and sending the preprocessing algorithm to the first master edge controller.

5. The method as claimed in claim 1, further comprising:

performing the first data analysis on the first field data from the first master edge controller to obtain a numerical value of the first apparatus operation indicator;

judging whether the numerical value of the first apparatus operation indicator is abnormal;

determining an algorithm update instruction according to the numerical value based on the numerical value being abnormal, the algorithm update instruction being used for instructing the first master edge controller to preprocess other second field data obtained later according to a target preprocessing algorithm; and sending the algorithm update instruction to the first master edge controller.

6. The method as claimed in claim 1, wherein the plurality of edge controllers includes a plurality of master edge controllers, the plurality of master edge controllers including the first master edge controller, and each respective master edge controller among the plurality of master edge controllers being used to send corresponding first field data to the cloud platform; and the method further comprises:

determining a load of each respective master edge controller among the plurality of master edge controllers according to a data amount of the corresponding first field data from the respective master edge controller, a relationship between data among the corresponding first field data from the respective master edge controller, and a number and complexity of preprocessing algorithms run by the respective master edge controller, at least one of the preprocessing algorithms being run on the respective master edge controller, and respective preprocessing algorithms among the preprocessing algorithms being used for processing different second field data into the corresponding first field data, determining a second master edge controller with a largest load among the plurality of master edge controllers, judging whether the load of the second master edge controller is higher than a first load threshold, generating a load transfer instruction based on the load of the second master edge controller being higher than the first load threshold, the load transfer instruction being used to transfer at least one preprocessing algorithm running on the second master edge controller to a second edge controller among the plurality of edge controllers, and instruct the second edge controller to send corresponding first field data to be obtained by using the transferred preprocessing algorithm to the cloud platform, a load of the second edge controller being lower than a second load threshold, and the second load threshold being lower than the first load threshold, and sending the load transfer instruction to the second master edge controller and the second edge controller.

7. A non-transitory computer-readable medium storing a computer instruction that, when executed by a processor, causes the processor to implement the method as claimed in claim 1.

8. A field data transmission method, comprising:

receiving, at a first edge controller, a control message from a cloud platform;

judging whether the first edge controller is a first master edge controller according to the control message;

performing first operations in response to the first edge controller being the first master edge controller, the first operations including obtaining second field data according to the control message, the second field data being used to characterize an operating state of at least one field apparatus, the second field data being collected by the first master edge controller and at least one other edge controller, preprocessing the second field data to obtain first field data, the first field data being used for the cloud platform to perform data analysis to obtain first apparatus operation indicators corresponding to the control message, and sending the first field data to the cloud platform; and performing second operations in response to the first edge controller not being the first master edge controller, the second operations including collecting third field data according to the control message, and sending the collected third field data to the first master edge controller indicated by the control message.

9. The method as claimed in claim 8, further comprising:

receiving a first preprocessing algorithm from the cloud platform before the preprocessing of the second field data, the first preprocessing algorithm corresponding to one of the first apparatus operation indicators, the preprocessing of the second field data includes preprocessing the second field data by using the first preprocessing algorithm to obtain the first field data.

10. The method as claimed in claim 9, further comprising:

receiving a load transfer instruction from the cloud platform after the sending of the first field data, the load transfer instruction indicating at least one preprocessing algorithm as needing to be transferred;

identifying whether the first edge controller is a second master edge controller or a second edge controller indicated by the load transfer instruction;

transferring the at least one preprocessing algorithm running on the first edge controller to a third edge controller in response to the first edge controller being the second master edge controller, the third edge controller obtaining fourth field data by using the transferred at least one preprocessing algorithm and sends the obtained fourth field data to the cloud platform, and the load of the third edge controller being lower than a second load threshold; and
perform third operations in response to the first edge controller being the second edge controller indicated by the load transfer instruction, the third operations including
obtaining the at least one preprocessing algorithm indicated by the load transfer instruction as needing to be transferred,
obtaining corresponding second field data to be preprocessed by the at least one preprocessing algorithm,
using the at least one preprocessing algorithm to preprocess the obtained corresponding second field data to obtain fifth field data, and
sending the obtained fifth field data to the cloud platform.

11. The method as claimed in claim 8, further comprising:
receiving an algorithm update instruction from the cloud platform after the sending the first field data; and
replacing a previously used preprocessing algorithm with a target preprocessing algorithm according to the algorithm update instruction, the previously used preprocessing algorithm being previously used for performing the preprocessing of the second field data, and the target preprocessing algorithm being for use in preprocessing re-obtained second field data.

12. The method as claimed in claim 8, further comprising:
receiving a load transfer instruction from the cloud platform after the sending of the first field data, the load transfer instruction indicating at least one preprocessing algorithm as needing to be transferred;
identifying whether the first edge controller is a second master edge controller or a second edge controller indicated by the load transfer instruction;
transferring the at least one preprocessing algorithm running on the first edge controller to a third edge controller in response to the first edge controller being the second master edge controller, the third edge controller obtaining fourth field data by using the transferred at least one preprocessing algorithm and sending the obtained fourth first field data to the cloud platform, and the load of the third edge controller being lower than a second load threshold; and
perform third operations in response to the first edge controller being the second edge controller indicated by the load transfer instruction, the third operations including
obtaining the at least one preprocessing algorithm indicated by the load transfer instruction as needing to be transferred,
obtaining corresponding second field data to be preprocessed by the at least one preprocessing algorithm,
using the at least one preprocessing algorithm to preprocess the obtained corresponding second field data to obtain fifth field data, and
sending the obtained fifth field data to the cloud platform.

13. A cloud platform comprising:
at least one memory configured to store a machine-readable program; and
at least one processor configured to invoke the machine-readable program to
determine a first apparatus operation indicator to be obtained by a first data analysis,
generate a control message for the first apparatus operation indicator, the control message being used to determine a first master edge controller from among a plurality of edge controllers, the first master edge controller being used to send first field data to the cloud platform, the first field data being used for the cloud platform to perform the first data analysis, the first field data being obtained by preprocessing second field data by the first master edge controller, the second field data being collected by a first edge controller among the plurality of edge controllers, and the second field data being used for characterizing operating states of at least one field apparatus,
send the control message to each of the plurality of edge controllers, and
receive the first field data from the first master edge controller corresponding to the control message.

14. The cloud platform as claimed in claim 13, wherein the at least one processor is configured to invoke the machine-readable program to:
perform a second data analysis on third field data from the plurality of edge controllers to obtain a numerical value of a second apparatus operation indicator, the third field data being received by the cloud platform before the first field data;
judge whether the numerical value of the second apparatus operation indicator is within a normal value range; and
determine the first apparatus operation indicator according to the numerical value of the second apparatus operation indicator in response to determining that the numerical value of the second apparatus operation indicator is outside of the normal value range, the first apparatus operation indicators being different from the second apparatus operation indicators.

15. The cloud platform as claimed in claim 14, wherein
the plurality of edge controllers includes a plurality of master edge controllers, the plurality of master edge controllers including the first master edge controller, and each respective master edge controller among the plurality of master edge controllers being used to send corresponding first field data to the cloud platform; and
the at least one processor is configured to invoke the machine-readable program to:
determine a load of each respective master edge controller among the plurality of master edge controllers according to
a data amount of the corresponding first field data received from the respective master edge controller,
a relationship between data among the corresponding first field data received from the respective master edge controller, and
a number and complexity of preprocessing algorithms run by the respective master edge controller, at least one of the preprocessing algorithms being run on the master edge controller, and respective processing algorithms among the preprocessing algorithms being used for processing different second field data into the corresponding first field data,
determine a second master edge controller with a largest load among the plurality of master edge controllers,
judge whether the load of the second master edge controller is higher than a first load threshold, generate a load transfer instruction based on the load of the second master edge controller being higher than the first load threshold, the load transfer instruction being used to transfer at least one preprocessing algorithm running on the second master edge controller to a second edge controller among the plurality of edge controllers, and instruct the second edge controller to send corresponding first field data to be obtained by using the transferred preprocessing algorithm to the cloud platform, a load of the second edge controller being lower than a preset second load threshold, and the second load threshold being lower than the first load threshold, and send the load transfer instruction to the second master edge controller and the second edge controller.

16. The cloud platform as claimed in claim 13, wherein the at least one processor is configured to invoke the machine-readable program to:

determine a preprocessing algorithm corresponding to the first apparatus operation indicator, the preprocessing algorithm being used for the first master edge controller to preprocess the second field data into the first field data, and the first master edge controller being used for sending to the cloud platform the first field data required for the first data analysis of the first apparatus operation indicator; and send the preprocessing algorithm to the first master edge controller.

17. The cloud platform as claimed in claim 13, wherein the at least one processor is configured to invoke the machine-readable program to:

perform the first data analysis on the first field data from the first master edge controller;

obtain a numerical value of the first apparatus operation indicator;

judge whether the numerical value of the first apparatus operation indicator is abnormal;

determine an algorithm update instruction according to the numerical value based on the numerical value being abnormal, the algorithm update instruction being used for instructing the first master edge controller to preprocess other second field data obtained later according to a target preprocessing algorithm; and send the algorithm update instruction to the first master edge controller.

18. The cloud platform as claimed in claim 13, wherein the plurality of edge controllers includes a plurality of master edge controllers, the plurality of master edge controllers including the first master edge controller, and each respective master edge controller among the plurality of master edge controllers being used to send corresponding first field data to the cloud platform; and the at least one processor is configured to invoke the machine-readable program to:

determine a load of each respective master edge controller among the plurality of master edge controllers according to a data amount of the corresponding first field data received from the respective master edge controller, a relationship between data among the corresponding first field data received from the respective master edge controller, and a number and complexity of preprocessing algorithms run by the respective master edge controller, at least one of the preprocessing algorithms being run on the respective master edge controller, and respective preprocessing algorithms among the preprocessing algorithms being used for processing different second field data into the corresponding first field data, determine a second master edge controller with a largest load among the plurality of master edge controllers, judge whether the load of the second master edge controller is higher than a first load threshold, generate a load transfer instruction based on the load of the second master edge controller being higher than the first load threshold, the load transfer instruction being used to transfer at least one preprocessing algorithm running on the second master edge controller to a second edge controller among the plurality of edge controllers, and instruct the second edge controller to send corresponding first field data to be obtained by using the transferred preprocessing algorithm to the cloud platform, a load of the second edge controller being lower than a preset second load threshold, and the second load threshold being lower than the first load threshold, and send the load transfer instruction to the second master edge controller and the second edge controller.

19. A field data transmission system comprising:
the cloud platform as claimed in claim 13; and
at least two edge controllers.

20. The field data transmission system as claimed in claim 19, further comprising:

at least one gateway, each respective gateway among the at least one gateway being connected to the cloud platform and at least one corresponding edge controller among the at least two edge controllers, and the respective gateway being configured to transmit communication data between the at least one corresponding edge controller and the cloud platform.

21. An edge controller comprising:
at least one memory configured to store a machine-readable program; and
at least one processor configured to invoke the machine-readable program to
receive a control message from a cloud platform,
judge whether the edge controller is a first master edge controller according to the control message,
perform first operations in response to the edge controller being the first master edge controller, the first operations including
obtaining second field data according to the control message, the second field data being used to characterize an operating state of at least one field apparatus, and the second field data being collected by the first master edge controller and at least one other edge controller,
preprocessing the second field data to obtain first field data, the first field data being used for the cloud platform to perform data analysis to obtain first apparatus operation indicators corresponding to the control message, and
sending the first field data to the cloud platform, and
perform second operations in response to the edge controller not being the first master edge controller, the second operations including collecting third field data according to the control message, and sending the collected third field data to the first master edge controller indicated by the control message.

22. The edge controller as claimed in claim 21, wherein the at least one processor is configured to invoke the machine-readable program to:

receive a first preprocessing algorithm from the cloud platform, the first preprocessing algorithm corresponding to one of the first apparatus operation indicators; and preprocess the second field data by using the first preprocessing algorithm to obtain the first field data.

23. The edge controller as claimed in claim 22, wherein the edge controller is a first edge controller; and the at least one processor is configured to invoke the machine-readable program to receive a load transfer instruction from the cloud platform, the load transfer instruction indicating at least one preprocessing algorithm as needing to be transferred, identify whether the first edge controller is a second master edge controller or second edge controller indicated by the load transfer instruction, transfer the at least one preprocessing algorithm running on the first edge controller to a third edge controller in response to the first edge controller being the second master edge controller, the third edge controller obtaining fourth field data by using the transferred at least one preprocessing algorithm and sending the obtained fourth field data to the cloud platform, and the load of the third edge controller being lower than a second load threshold, and perform fourth operations in response to the first edge controller being the second edge controller indicated by the load transfer instruction, the fourth operations including obtaining the at least one preprocessing algorithm indicated by the load transfer instruction as needing to be transferred, obtaining corresponding second field data to be preprocessed by the at least one preprocessing algorithm, preprocessing the obtained corresponding second field data by using the at least one preprocessing algorithm to obtain fifth field data, and sending the obtained fifth field data to the cloud platform.

24. The edge controller as claimed in claim 21, wherein the at least one processor is configured to invoke the machine-readable program to:

receive an algorithm update instruction from the cloud platform; and replace a previously used preprocessing algorithm with a target preprocessing algorithm according to the algorithm update instruction, the target preprocessing algorithm being for use in preprocessing re-obtained second field data.

25. The edge controller as claimed in claim 21, wherein the edge controller is a first edge controller; and the at least one processor is configured to invoke the machine-readable program to receive a load transfer instruction from the cloud platform, the load transfer instruction indicating at least one preprocessing algorithm as needing to be transferred, identify whether the first edge controller is a second master edge controller or second edge controller indicated by the load transfer instruction, transfer the at least one preprocessing algorithm running on the first edge controller to a third edge controller in response to the first edge controller being the second master edge controller, the third edge controller obtaining fourth field data by using the transferred at least one preprocessing algorithm and sending the obtained fourth field data to the cloud platform, and the load of the third edge controller being lower than a second load threshold, and perform third operations in response to the first edge controller being the second edge controller indicated by the load transfer instruction, the third operations including;

obtaining the at least one preprocessing algorithm indicated by the load transfer instruction as needing to be transferred, obtaining corresponding second field data to be preprocessed by the at least one preprocessing algorithm;

preprocessing the obtained corresponding second field data by using the at least one preprocessing algorithm to obtain fifth field data, and sending the obtained fifth field data to the cloud platform.

* * * * *